United States Patent
Hughes et al.

(10) Patent No.: US 9,887,976 B2
(45) Date of Patent: Feb. 6, 2018

(54) MULTI-FACTOR AUTHENTICATION USING QUANTUM COMMUNICATION

(71) Applicant: Los Alamos National Security, LLC, Los Alamos, NM (US)

(72) Inventors: Richard John Hughes, Los Alamos, NM (US); Charles Glen Peterson, Los Alamos, NM (US); James T. Thrasher, Baltimore, MD (US); Jane E. Nordholt, Los Alamos, NM (US); Jon T. Yard, Santa Barbara, CA (US); Raymond Thorson Newell, Santa Fe, NM (US); Rolando D. Somma, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/424,295

(22) PCT Filed: Aug. 16, 2013

(86) PCT No.: PCT/US2013/055410
§ 371 (c)(1),
(2) Date: Feb. 26, 2015

(87) PCT Pub. No.: WO2014/035696
PCT Pub. Date: Mar. 6, 2014

(65) Prior Publication Data
US 2015/0222619 A1    Aug. 6, 2015

Related U.S. Application Data

(60) Provisional application No. 61/695,190, filed on Aug. 30, 2012.

(51) Int. Cl.
*G06F 21/00* (2013.01)
*H04L 9/00* (2006.01)
(Continued)

(52) U.S. Cl.
CPC .............. *H04L 63/08* (2013.01); *G06F 21/31* (2013.01); *H04L 9/0852* (2013.01);
(Continued)

(58) Field of Classification Search
CPC .............. G06F 9/505; G06F 2221/2115; H04L 2209/38; H04L 9/3226; H04L 9/3236
(Continued)

(56) References Cited

U.S. PATENT DOCUMENTS 7,069,234 B1 *   6/2006   Cornelius .............. G06Q 20/10
                                                            705/26.35
7,610,233 B1 *  10/2009   Leong .................. G06Q 10/087
                                                            705/26.3
(Continued)

FOREIGN PATENT DOCUMENTS

WO    WO-2007/123869    11/2007
WO    WO-2009/141587    11/2009
(Continued)

OTHER PUBLICATIONS

Joshua Bolten, E-Authentication Guidance for Federal Agencies, Dec. 16, 2003, Office of Management & Budget, p. 11.*
(Continued)

*Primary Examiner* — Alexander Lagor
*Assistant Examiner* — William B Jones
(74) *Attorney, Agent, or Firm* — Pierce Atwood LLP; Kevin M. Farrell

(57) ABSTRACT

Multi-factor authentication using quantum communication ("QC") includes stages for enrollment and identification. For example, a user enrolls for multi-factor authentication that uses QC with a trusted authority. The trusted authority transmits device factor information associated with a user device (such as a hash function) and user factor information associated with the user (such as an encrypted version of a
(Continued)

user password). The user device receives and stores the device factor information and user factor information. For multi-factor authentication that uses QC, the user device retrieves its stored device factor information and user factor information, then transmits the user factor information to the trusted authority, which also retrieves its stored device factor information. The user device and trusted authority use the device factor information and user factor information (more specifically, information such as a user password that is the basis of the user factor information) in multi-factor authentication that uses QC.

10 Claims, 13 Drawing Sheets

(51) Int. Cl.
  *H04L 29/06* (2006.01)
  *G06F 21/31* (2013.01)
  *H04L 9/08* (2006.01)
  *H04L 9/32* (2006.01)
(52) U.S. Cl.
  CPC .......... *H04L 9/3226* (2013.01); *H04L 9/3236* (2013.01); *H04L 63/083* (2013.01); *G06F 2221/2115* (2013.01); *H04L 2209/38* (2013.01); *H04L 2463/082* (2013.01)
(58) Field of Classification Search
  USPC ....... 709/200, 206; 718/104; 726/24; 713/68
  See application file for complete search history.

(56) References Cited

U.S. PATENT DOCUMENTS

| | | | | |
|---|---|---|---|---|
| 8,693,691 | B2* | 4/2014 | Jacobs | H04L 9/0852 380/278 |
| 8,990,583 | B1* | 3/2015 | McEachron | G06F 21/123 380/227 |
| 9,002,009 | B2 | 4/2015 | Nordholt et al. | |
| 2004/0064351 | A1* | 4/2004 | Mikurak | G06Q 10/087 705/22 |
| 2004/0238813 | A1* | 12/2004 | Lidar | B82Y 10/00 257/31 |
| 2007/0140495 | A1 | 6/2007 | Berzanskis et al. | |
| 2008/0263363 | A1* | 10/2008 | Jueneman | G06F 21/32 713/184 |
| 2010/0250497 | A1* | 9/2010 | Redlich | F41H 13/00 707/661 |
| 2011/0213979 | A1* | 9/2011 | Wiseman | H04L 9/0844 713/171 |
| 2012/0177201 | A1 | 7/2012 | Ayling et al. | |
| 2013/0318358 | A1* | 11/2013 | Wang | G06F 21/31 713/182 |

FOREIGN PATENT DOCUMENTS

WO  WO-2012/044852  4/2012
WO  WO-2012/044855  4/2012

OTHER PUBLICATIONS

Becker "Merkle Signature Schemes, Merkle Trees and Their Cryptanalysis," Downloaded from http://citeseerx.ist.psu.edu/viewdoc/download?doi=10.1.1.392.7879&rep=rep1&type=pdf on May 4, 2015; Article dated Jul. 18, 2008 (28 pages).
Damgard et al., "Secure Identification and QKD in the Bounded-Quantum-Storage Model," Crypto 2007, Lecture Notices Computer Science, 4622, pp. 342-359 (2007).
Extended European Search Report for European Patent Application No. EP 13833805.8 dated Apr. 14, 2016 (10 pages).
Guillou et al., "New Hash Functions for Message Authentication," Advances in Cryptology Eurocrypt 95, Springer-Verlag Berlin Heidelberg, Krawczyk ed., pp. 301-310 (1995).
Hillery et al., "Quantum Secret Sharing," Physical Review A, vol. 59, No. 3, pp. 1829-1834 (1999).
International Search Report and Written Opinion for International Application No. PCT/US13/055410 dated Mar. 4, 2014 (10 pages).
Kunz-Jacques et al., "Using Hash-Based Signatures to Bootstrap Quantum Key Distribution," arXiv:1109.2844 </abs/1109.2844> [quant-ph], Cornell University Library, 15 pages (2011).

* cited by examiner

| user device 1 (or fillgun for user device 1) | | trusted authority (TA) |
|---|---|---| receive biometric indicia $B$ and encrypt with key $AK_0(1)$

→ $E[B; AK_0(1)]$ → authenticate user 1

QKD with TA ↔ $K(1,j), L(1,j), M(1), AK_1(1)$ ↔ QKD with user device 1 (or fillgun)

- 
- 
-

[for $i=2$ to $N$, repeat authentication and QKD for user device $i$, which distributes $K(i,j), L(i,j), M(i)$, and $AK_1(i)$ for that user device $i$]

determine $P(i,j)$ and $A(i,j)$ receive $P(1,j)$ and $A(1,j)$ ← $P(1,j)$ and $A(1,j)$

- 
- 
-

[for $i=2$ to $N$, distribute $P(i,j)$ and $A(i,j)$ to that user device $i$]

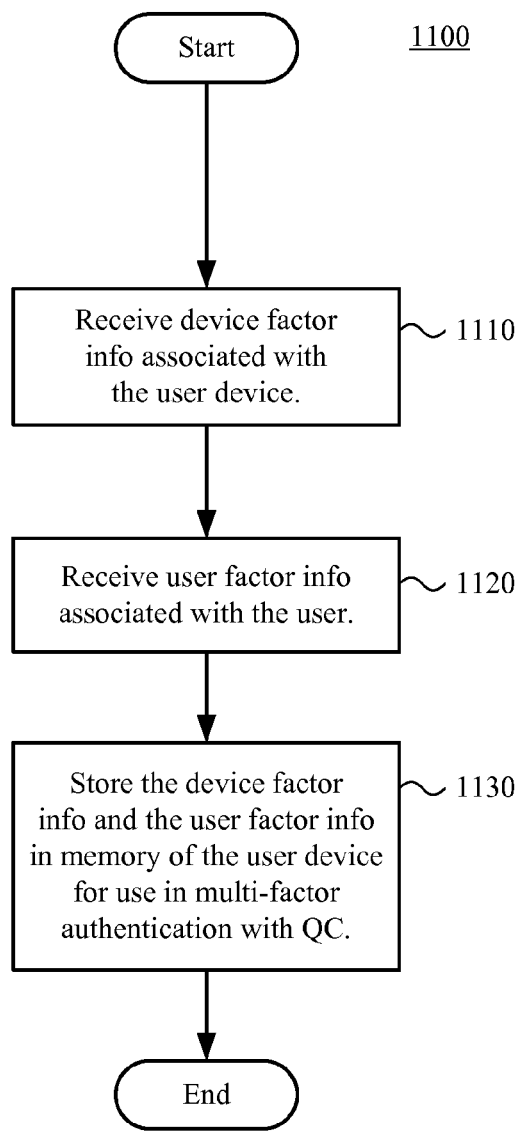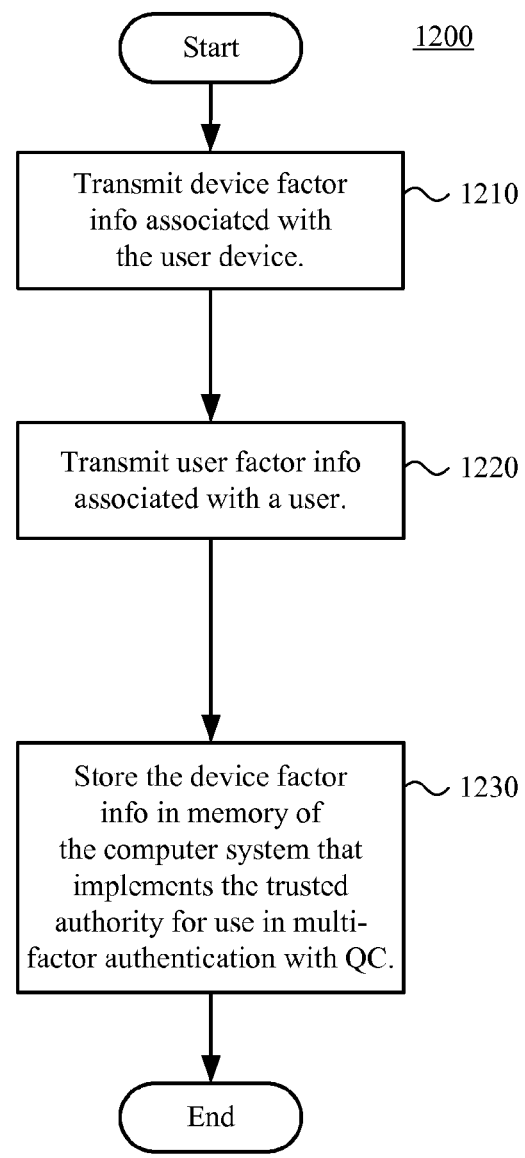

MULTI-FACTOR AUTHENTICATION USING QUANTUM COMMUNICATION

CROSS REFERENCE TO RELATED APPLICATION

This application claims the benefit of U.S. Provisional Patent Application No. 61/695,190, filed Aug. 30, 2012, the disclosure of which is hereby incorporated by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages. The process of producing such keys through QC is also called quantum key distribution ("QKD").

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QKD, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (×) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Other approaches to QC exploit other quantum properties (e.g., quantum entanglement) to exchange information encoded in quantum states. In addition, techniques such as privacy amplification can be used to eliminate the partial information that an eavesdropper can acquire. Techniques such as information reconciliation can be used to resolve small discrepancies in the shared bit values of the transmitter and receiver.

The theoretical framework for QC has been established for over 25 years, and its advantages in terms of security of keys are well accepted. Over the past two decades, implementations of QKD systems have become cheaper, more reliable, easier to maintain (e.g., self-tuning, self-checking), and easier to use. Even so, compared to other security solutions, QKD system have tended to be expensive and difficult to deploy. A typical QKD system is large and operates only in point-to-point mode over a fiber connection between transmitter and receiver. Several commercially available QKD systems perform QKD only over point-topoint links, are not portable, and require a dedicated fiber connection. Moreover, their QC cannot co-exist with network traffic. Smaller footprint, less expensive devices for QKD have recently been developed, which can engage in QC over the same channel as regular network traffic, and which can be used in conjunction with protocols for secure multi-party communication. These advances may help QKD gain a commercial foothold. Such QKD devices and technologies do not address certain practical problems of user authentication, however.

SUMMARY

Innovations described herein provide methods for multi-factor authentication that use quantum communication ("QC"). At a high level, the multi-factor authentication uses "something remembered" as a first factor for the authentication and "something possessed" as a second factor for the authentication. For example, the first factor can be a user password remembered by the user, and the second factor can be a device possessed by the user, or information securely associated with such a device. The multi-factor authentication provides advantages in terms of efficiency, security, ease of implementation and usability.

According to a first set of innovations described herein, a user enrolls for multi-factor authentication that uses QC with a computer system that implements a trusted authority. A user device (such as a QC card as described in section I or other device) receives device factor information associated with the user device. For example, the device factor information specifies a hash function, e.g., as a Toeplitz matrix, or is other information for a hash function. The user device also receives user factor information associated with the user. For example, the user factor information is an encrypted version of a user password that the user has provided. The user device stores the device factor information and the user factor information in memory of the user device for use in multi-factor authentication. For example, as part of the storing, for the device factor information, an indication of the hash function is stored in the memory of the user device. The user device can also receive verification information and store the verification information in the memory of the user device, for use in authenticating the trusted authority. The device factor information, user factor information and/or verification information are typically received from the computer system that implements the trusted authority directly (e.g., in an in-person enrollment session), but alternatively are received over a network connection.

According to a second set of innovations described herein (from the perspective of the trusted authority), a user is enrolled for multi-factor authentication that uses QC with a computer system that implements a trusted authority. The computer system that implements the trusted authority transmits device factor information associated with the user device. For example, the device factor information specifies a hash function, e.g., as a Toeplitz matrix, or is other information for a hash function. The information for the hash function can be determined based at least in part on output of a random number generator. The computer system also transmits user factor information associated with a user. For example, the user factor information is an encrypted version of a user password, where the user password is received from a user and encrypted (e.g., using a secret encryption key of the trusted authority) to produce the encrypted version of the user password. The computer system stores the device factor information in memory of the computer system that implements the trusted authority for use in multi-factor authentication. For example, as part of the storing, for the device factor information, an indication of the hash function is stored in the memory of the computer system. The computer system can also determine verification information associated with digital signature keys of the trusted authority, then transmit the verification information. The device factor information, user factor information and/or verification information are typically transmitted to a user device directly (e.g., in an in-person enrollment session), but alternatively are transmitted over a network connection.

According to a third set of innovations described herein, a user device performs multi-factor authentication that uses QC with a computer system that implements a trusted authority. The user device retrieves, from memory of the user device, device factor information associated with the user device. For example, when the device factor information is information for a hash function, an indication of the hash function is retrieved from the memory of the user device. The user device also retrieves, from memory of the user device, user factor information associated with a user. For example, the user factor information is an encrypted version of a user password. As part of the multi-factor authentication, the user device can receive user input for the user password (e.g., 8-12 ASCII characters) for use by the user device in the multi-factor authentication, and transmit the encrypted version of the user password (retrieved from memory of the user device) for use by the trusted authority to recover the user password.

The user device uses the device factor information and the user factor information in multi-factor authentication that uses QC with the computer system that implements the trusted authority. The QC in the multi-factor authentication can include use of decoy states, privacy amplification and/or error correction. For example, the user device transmits pulses of photons in decoy states and pulses of photons in non-decoy states, receives a set of detection indices signed by the trusted authority, retrieves verification information from the memory of the user device, verifies the trusted authority using the verification information and signed detection indices, and transmits an indication of non-decoy states. When the device factor information is information for a hash function, the user device can receive information indicating obscured measuring bases for QC, and recover the actual measuring bases using the hash function and a user password (e.g., applying the hash function to the user password, then computing exclusive-OR of (1) the obscured information indicating measuring bases and (2) results of applying the hash function to the user password, so as to recover the actual measuring bases). The user device then compares the measuring bases to sending bases for the QC, and determines shared secret bits for the QC.

In further processing for the authentication, the user device can exchange information for two hash functions with the trusted authority, apply the two hash functions, respectively, to (1) shared secret bits resulting from QC and (2) a user password, so as to produce a verification value, then transmit the verification value. The user device then receives an indication of success or failure of the multi-factor authentication.

According to a fourth set of innovations described herein (from the perspective of the trusted authority), a computer system that implements a trusted authority performs multi-factor authentication that uses QC. The computer system receives user factor information associated with a user. For example, the user factor information is an encrypted version of a user password, in which case the computer system can recover the user password from the encrypted version of the user password using a secret encryption key of the trusted authority. The computer system also retrieves, from memory of the computer system, device factor information associated with the user device. For example, when the device factor information is information for a hash function, an indication of the hash function is retrieved from the memory of the computer system that implements the trusted authority.

The computer system uses the device factor information and the user factor information in multi-factor authentication that uses QC with the user device. The QC in the multi-factor authentication can include use of decoy states, privacy amplification and/or error correction. For example, the computer system receives pulses of photons in decoy states and pulses of photons in non-decoy states, transmits a set of detection indices signed by the trusted authority, and receives an indication of non-decoy states. When the device factor information is information for a hash function, the computer system can apply the hash function to a user password, and obscure measuring bases for QC (e.g., computing exclusive-OR of (1) information indicating measuring bases and (2) results of applying the hash function to the user password), transmit the obscured measuring bases. The computer system then receives an indication of which of the measuring bases match sending bases for the QC, and determines shared secret bits for the QC.

In further processing for the authentication, the computer system can exchange information for two hash functions with the user device, apply the two hash functions, respectively, to (1) shared secret bits resulting from QC and (2) a user password, so as to produce a comparison value, receive a verification value, and compare the verification value to the comparison value. The computer system transmits an indication of success or failure of the multi-factor authentication.

The foregoing and other objects, features, and advantages of the invention will become more apparent from the following detailed description, which proceeds with reference to the accompanying figures.

BRIEF DESCRIPTION OF THE DRAWINGS

FIG. 6 is a diagram illustrating an example protocol that includes QKD between a trusted authority and one or more user devices for secure multi-party communication.

FIGS. 11 and 12 are flowcharts illustrating generalized techniques for enrolling for multi-factor authentication with QC from the perspective of a user device and trusted authority, respectively.

DETAILED DESCRIPTION

Figure 1:
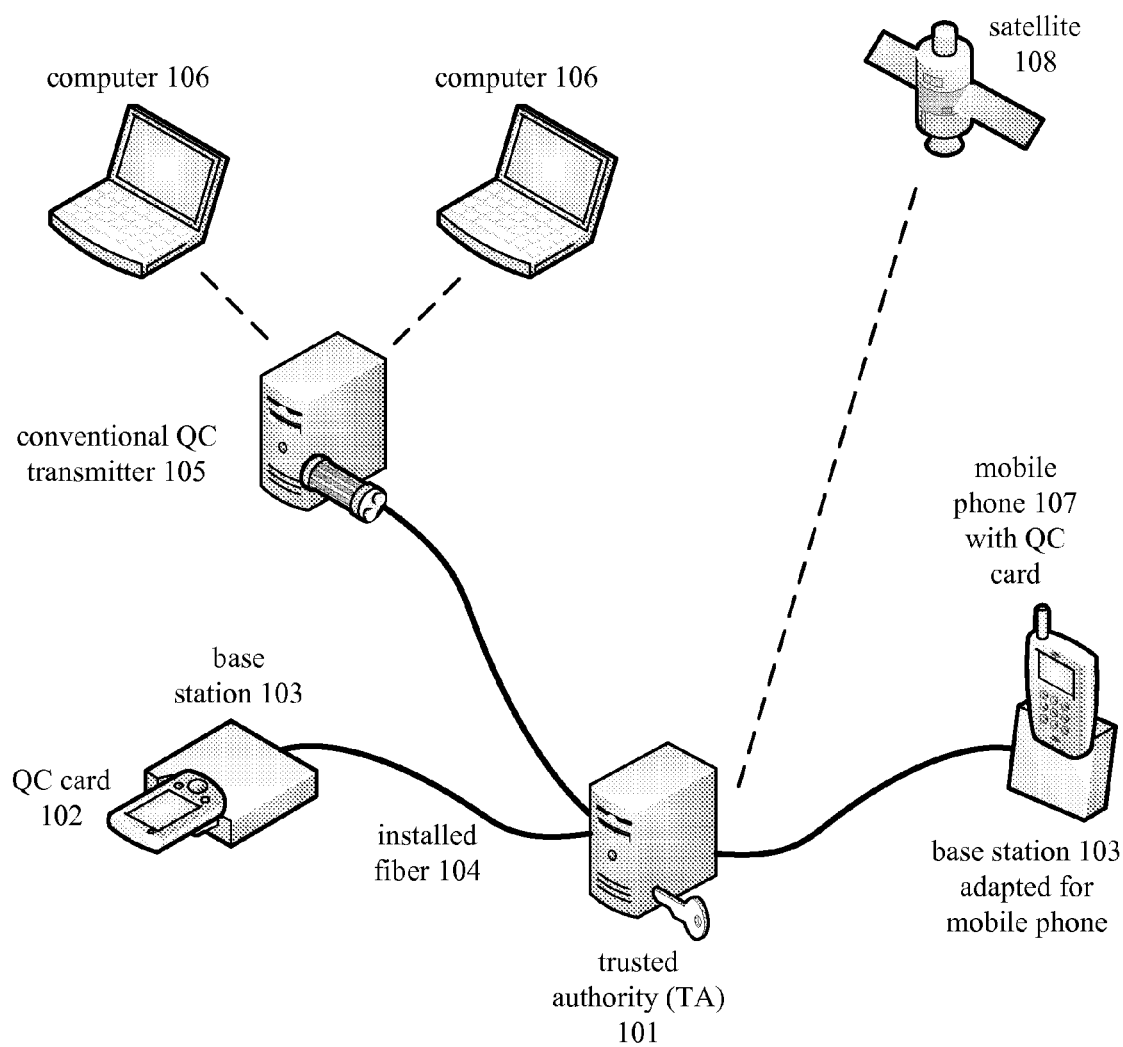
FIG. 1 is a diagram of an example operating environment in which keys are acquired through QKD, and in which multi-factor authentication with QC can be performed.

Multi-factor authentication with QC uses "something remembered" and "something possessed" as first and second factors, respectively, for authentication. In example implementations, the first factor is a user password, and the second factor is a device possessed by a user, or information securely associated with such a device. As part of the authentication protocol, the user can prove to a trusted authority that the user both knows the password and possesses the device. If authentication succeeds, and the user establishes a trust relationship with the trusted authority, the user and trusted authority have shared secret bits, which can be used as a password to log in to a computer system, enter a secure web site, gain access to a building, establish proof of the user's identity, perform further QC for password-authenticated key establishment, generate additional shared secret bits, or for some other purpose. Compared to previous approaches to user authentication, the multi-factor approaches described herein have advantages in terms of efficiency, security, practicality and usability.

In the example implementations, various features of the system are computationally lightweight and relatively fast, and can be implemented in hardware relatively efficiently. This makes the innovations for multi-factor authentication with QKD especially suitable for use in devices with constrained resources such as handheld devices and in smart grid applications.

The multi-factor authentication innovations can be used in various applications that involve secure communications, including commercial sales, banking, conferencing and military systems. The multi-factor authentication innovations can be used to secure enterprise networks or industrial control systems, provide consumer services in secure ways, or provide access control and identification tokens.

For the sake of presentation, in some places, the term "trusted authority" is used as shorthand for a computing system that implements the role of trusted authority, and the term "user" is used to indicate a computing system associated with a user. Unless the context clearly indicates otherwise, operations described herein are implemented with and performed by computing systems. For example, description of transmission of information to a trusted authority or user, determination of a value, and receipt of information from a trusted authority or user generally indicate operations with a computing system associated with the trusted authority or user. On the other hand, description of user input or biometric input to a user device implies a human user providing such input.

In addition, the terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose computer hardware with software implementing the functionality described herein.

The term "user device" generally indicates a computing system associated with a user.

Various alternatives to the implementations described herein are possible. Certain techniques described with reference to flowchart diagrams can be altered by changing the ordering of stages shown in the flowcharts, by splitting, repeating or omitting certain stages, etc. Different aspects of the multi-factor authentication described herein can be used in combination or separately. Different embodiments implement one or more of the described techniques and tools. Some of the techniques and tools described herein address one or more of the problems noted in the background. Typically, a given technique/tool does not solve all such problems.

I. Example Operating Environments.

FIG. 1 shows an example operating environment (100) in which various user devices acquire keys through QKD with a trusted authority (101). The user devices include a QC card (102) that couples with a base station (103), a mobile phone (107) that has a QC card, a satellite (108), and several computers (106) connected to a conventional QC transmitter (105). A user device can be for an individual user or for a business, financial institution or government institution as user.

A computing system implements the trusted authority (101). The trusted authority (101) authenticates a user (e.g., according to part of a multi-factor authentication protocol described herein), produces quantum keys in communication with a user device (or conventional QC transmitter (105)), and stores the quantum keys. At some point, the trusted authority (101) performs QKD with different devices, and the trusted authority (101) stores quantum keys produced in the different QKD sessions. Thus, with reference to conventional roles for certain cryptographic protocols, the trusted authority (101) can generally act as a key distribution center (by generating/distributing quantum keys to user devices) and key translation center (by maintaining a database of quantum keys and other information used for QKD, and responding to requests for such information). Using quantum keys and other information provided by the trusted authority (101), a given user device can securely communicate with other user devices that have quantum keys from QKD with the trusted authority (101) or otherwise have established a trust relationship with the trusted authority (101).

The QC card (102) contains a miniaturized QC transmitter. The QC card (102) couples with a base station (103), which provides a network connection with the trusted authority (101) and can provide electric power to the QC card (102). Example implementations for a base station (103), QC card (102), and trusted authority adapted for QKD with a QC card (102) are detailed in U.S. patent application Ser. No. 12/895,720, filed Sep. 30, 2010, and PCT Patent Application No. PCT/US2011/054061, filed Sep. 29, 2011, which has been published as WO 2012/044852. Whereas conventional QKD solutions have tended to be expensive and difficult to deploy, example implementations of the QC card (102) and base station (103) are relatively inexpensive. A QC card (102) is easily carried, and quantum keys generated with QKD facilitate security that is stronger than that provided with conventional non-quantum key distribution.

Typically, as a pre-condition for QKD, the trusted authority (101) authenticates the user. For example, as part of an enrollment stage in an implementation of a multi-factor authentication protocol described herein, the user of the QC card (102) and trusted authority (101) perform such enrollment in person. The user of the QC card (102) provides a user password to the trusted authority (101). Different users are expected to have different user passwords, of course. The QC card (102) can also accept a fingerprint scan from the user, encrypt the fingerprint scan data, and transmit the encrypted material to the trusted authority (101) for comparison operations in later authentication by the trusted authority (101). Alternatively, the QC card (102) accepts other biometric information and/or other information that identifies the user.

As part of the implementation of the multi-factor authentication protocol, the trusted authority (101) can generate one-time digital signature keys as well as verification information for the digital signature keys. The trusted authority transmits such verification information to the QC card (102), for later use in verifying messages from the trusted authority (101) (such as detection indices used in QKD itself, or a signal indicating acceptance/rejection of the authentication). For a different user and QC card, the trusted authority is expected to generate different verification information. Apart from the multi-factor authentication protocol, the QC card (102) can generate its own one-time digital signature keys and verification information for its digital signature keys, and then transmit such verification information to the trusted authority (101), for later use in verifying messages from the user of the QC card (102).

For use in the multi-factor authentication protocol, the trusted authority (101) also generates or otherwise determines a hash function, and transmits the hash function to the QC card (102) for use in later stages of user authentication. For example, the hash function is specified as a Toeplitz matrix, or another type of hash function is used. The QC card (102) stores the hash function, for example, in secure memory on the QC card (102). The trusted authority (101) can determine different hash functions for different QC cards. In its memory, the trusted authority (101) stores the hash functions for the respective different QC cards.

Finally, the trusted authority (101) encrypts the user password transmitted by the QC card (102) using a secret mechanism (e.g., an encryption algorithm and encryption key known only to the trusted authority (101)) and transmits the encrypted version of the user password back to the QC card (102), for use in later user authentication.

Other stages of the multi-factor authentication protocol can be integrated with operations in which the QC card (102) performs QKD with the trusted authority (101) and stores the resulting quantum keys in secure memory on the QC card (102). For example, as part of an implementation of the multi-factor authentication protocol, to initiate the process, a user inserts the QC card (102) into the base station (103). The QC card (102) transmits the encrypted version of the user password to the trusted authority (101). The trusted authority (101) recovers the user password using its secret mechanism (e.g., encryption algorithm and private encryption key), which serves to identify the user to the trusted authority (101). The user also enters the password at the QC card (102), such that, without transmitting the user password again in unencrypted form, the password is available for use in later operations at both the trusted authority (101) (recovered from the encrypted password) and QC card (102) (from user input) to provide one factor of secure user authentication. Although the trusted authority (101) does not directly check the password, for the protocol to complete successfully the user password must be the same at the QC card (102) and trusted authority (101), as explained below.

As part of the protocol, the QC card (102) and trusted authority (101) engage in QC. Depending on implementation, the QC card (102) and trusted authority (101) can use features such as decoy states, privacy amplification and/or error correction to provide practical benefits. For example, in example implementations of the multi-factor authentication protocol, when the QC card (102) acts as a QC transmitter that uses decoy states in QC, the trusted authority (101) records when a photon has been detected using detection indices and transmits the detection indices to the QC card (102). The detection indices can be signed by the trusted authority (101) in a way that permits the QC card (102) to authenticate the trusted authority (101) using verification information provided by the trusted authority (101) during enrollment. The QC card (102) identifies detection indices that represent non-decoy pulses and communicates such information to the trusted authority (101).

For the set of measured pulses (or within the set of non-decoy pulses, when decoy pulses have been used), the trusted authority (101) identifies the measuring bases it used for the photons of the pulses. Rather than simply send such measuring bases to the QC card (102), the trusted authority (101) uses the hash function provided to the QC card (102) during enrollment to provide a level of security. For example, the trusted authority (101) hashes the user password (recovered from the encrypted version transmitted by the QC card (102)) using the hash function shared during enrollment, then obscures the record of its measuring bases using the results of the hash function. For this operation, the trusted authority (101) can compute the XOR of the measuring bases and the hashed user password. The trusted authority (101) then sends the obscured measuring bases to the QC card (102).

The QC card (102), which also has the hash function (from enrollment) and user password (from the user entering it), hashes the user password with the hash function. The QC card (102) recovers the measuring bases of the trusted authority (101) using the received information and hashed user password. The QC card (102) determines pulses for which its sending basis matches the measuring basis of the trusted authority, and sends an indication of the matching bases to the trusted authority (101), at which point the QC card (102) and trusted authority (101) can identify a common set of shared secret bits. The QC card (102) and trusted authority (101) can use privacy amplification and error correction to further refine the shared secret bits.

As a final stage of the multi-factor authentication protocol in this implementation, the QC card (102) and trusted authority (101) can exchange two additional hash functions, with the QC card (102) specifying a first hash function to the trusted authority (101), and the trusted authority (101) specifying a second hash function to the QC card (102). For example, the additional hash functions are Toeplitz matrices. The QC card (102) hashes the user password with one of the additional hash functions, hashes its version of the shared secret bits using the other additional hash function, and combines the results of the additional hash functions to produce a verification value. For example, the QC card (102) computes the XOR of the results of the additional hash functions. The QC card (102) transmits the verification value to the trusted authority (101), which computes a comparison value in the same way using the user password, its version of the shared secret bits, and the two additional hash functions. If the comparison value matches the verification value, the user is authenticated by the trusted authority (101), and the shared secret bits can be used for other key generation, as passwords, etc. Otherwise, if the comparison value does not match the verification value, the user is not authenticated by the trusted authority (101). The user might be given another chance to complete QKD, or the trusted authority (101) can terminate the QKD process.

In FIG. 1, the base station (103) is connected to the trusted authority (101) over installed fiber (104). The installed fiber (104) is used as a quantum channel for point-to-point QKD between the QC card (102) and trusted authority (101), for example, for transmission of photons encoded with quantum state information. The point-to-point QKD can happen over a single optical span or multiple spans in a fiber network whose topology supports QKD. For example, the topology includes intermediate routers between the QC card and trusted authority, but the routers preserve quantum state information. In FIG. 1, the installed fiber (104) is also used as a public channel to exchange non-quantum information between the QC card (102) and trusted authority (101), for example, verification information, non-quantum information about measuring bases in the QKD, hash functions, encrypted versions of user passwords and/or non-secret key information from the trusted authority (101). Alternatively, the QC card (102) and trusted authority (101) communicate non-quantum information over another type of network media (e.g., copper, RF) or free space (optical), or over a fiber network having another network topology.

In one use scenario, a business purchases QC cards (102) for its employees and purchases one or more base stations (103) located at its facilities. An employee periodically plugs his or her QC card (102) into a base station to load up on quantum keys. The QC card (102) can also receive verification information for digital signature keys, or generate digital signature keys and verification information. The employee can then use the quantum keys for activities such as purchasing over the Internet, authentication or access control at a remote site.

The mobile phone (107) includes a QC card (102) as well as conventional mobile phone components. The mobile phone (107) couples with a base station (103) that is adapted to connect to the mobile phone (107) and provides a network connection to the trusted authority (101). The mobile phone's base station (103) can also provide electric power and a data connection for synchronization of information on the mobile phone (107). The mobile phone (107) stores quantum keys produced by the QC card (102) and trusted authority (101) (e.g., in a QKD process with added security optionally provided by two-factor authentication according to a multi-factor authentication protocol described herein). The mobile phone (107) can also generate digital signature keys (and corresponding verification information), and receive and store verification information from the trusted authority (101). Example implementations for a mobile phone (107) that includes a QC card are described below.

As shown in FIG. 1, the trusted authority (101) can also produce quantum keys for devices other than a QC card (102), and generate digital signature keys (and verification information, as well as hash functions and encrypted user passwords for authentication) for such other devices. For example, the trusted authority (101) performs QKD to distribute quantum keys to a low-orbit satellite (108) using equipment for QC transmission and reception through free space. Or, the trusted authority (101) performs QKD with a conventional QC transmitter (105), which directly conveys the quantum keys produced by QKD to a locally connected computer (106) at a secure facility, with added security optionally provided by two-factor authentication according to a multi-factor authentication protocol described herein. The conventional QC transmitter (105) can connect to the trusted authority (101) over installed fiber (104) (e.g., standard fiber for telecommunications in a building, FTTx link, metro area, etc.) or free space (e.g., rooftop to rooftop, airplane to ground, ship to ship, satellite to ground).

In any case, the QKD produces cryptographic-quality secret random numbers, which can be used as quantum keys for encryption, secure multi-party audio or video communication, authentication, bank transactions, facility access control, access control for a computing system or database, access control for an online control system, vehicle access, digital signatures, e-voting, tele-presence or another application. As random numbers, the quantum keys have forward secrecy. The quantum keys do not depend on any pre-placed secret key, and they are not subject to conventional attacks, nor are they vulnerable to future advances that exploit increased computing power or flaws discovered in key generation algorithms. During enrollment with any type of device, the trusted authority (101) can generate digital signature keys to identify the trusted authority (101) to the device (in which case the trusted authority sends corresponding verification information to that device), receive a user password, and provide a hash function and encrypted version of the user password to use in user authentication. The trusted authority (101) can receive verification information from the device (corresponding to digital signature keys generated by the device) for use by the trusted authority or another device in identifying the device.

Some of the quantum keys produced by QKD can be used for authentication and other set-up operations before subsequent QKD sessions, so that such set-up operations are automatic and seamless to the user. For example, such quantum keys can be used when replenishing digital signature keys and communicating new verification information for the new digital signature keys.

In the examples shown in FIG. 1, the computing system that implements the trusted authority (101) has a QC receiver. Alternatively, computing system that implements the trusted authority (101) has a QC transmitter, and the other party to QKD includes a QC receiver.

Figure 2:
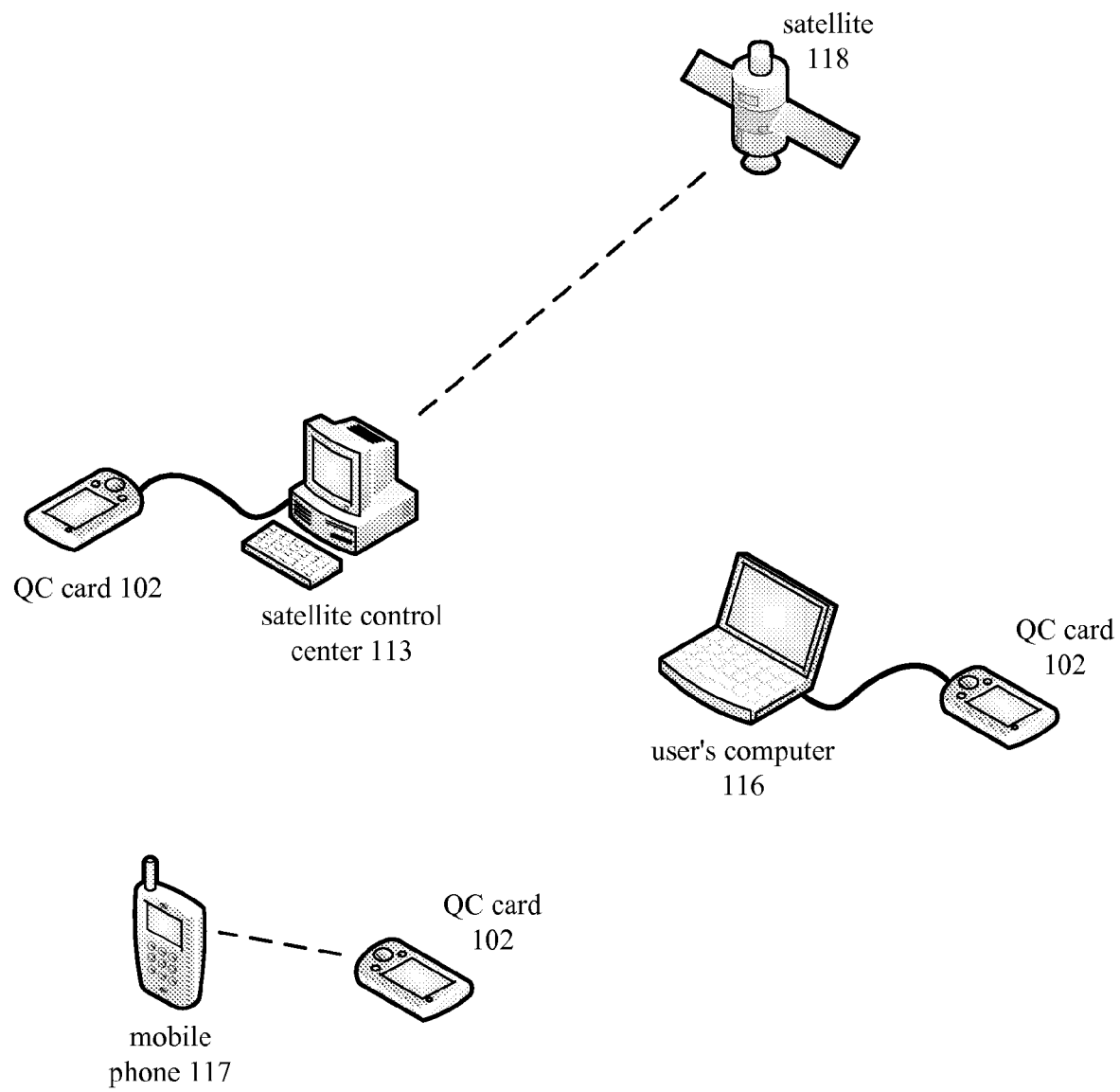
FIGS. 2 and 3 are diagrams of example operating environments in which keys are disseminated and used for encryption, authentication and access control.

FIG. 2 shows an example operating environment (200) in which a QC card (102) further distributes quantum keys obtained through QKD with the trusted authority. A QC card (102) can distribute stored quantum keys to a mobile phone (117) or a user's computer (116). For example, the QC card (102) transmits the quantum keys over a point-to-point fiber connection or wireless connection. Or, a QC card (102) provides quantum keys to a satellite control center (113), which uploads the quantum keys to a satellite (118). The QC card (102) can similarly distribute digital signature keys it has generated and/or verification information it has received.

In this way, the QC card (102) can be used as a "fillgun" to load quantum keys (as well as digital signature keys and/or verification information) from its secure memory into a remote encryptor on a spacecraft, naval vessel or other vehicle. For example, the QC card (102) loads up with quantum keys (as well as digital signature keys and/or verification information) while coupled with a base station at a terminal, is carried to a spacecraft before launch, and then loads the quantum keys (as well as digital signature keys and/or verification information) onto a computing device aboard the spacecraft. The computing device aboard the spacecraft can then use the quantum keys for secure communication with the terminal or another device.

Figure 3:
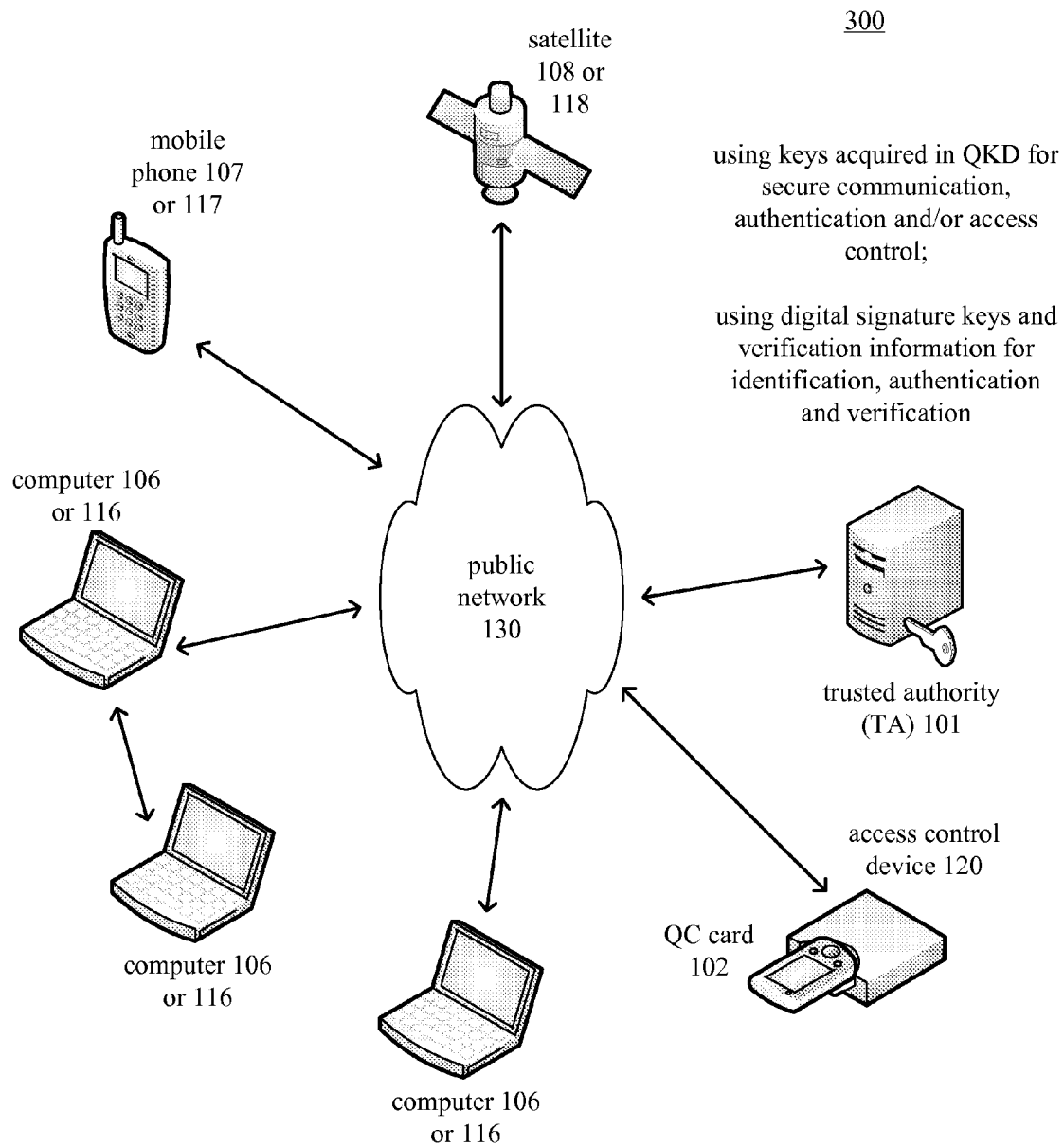

FIG. 3 shows an example operating environment (300) in which quantum keys distributed through QKD are used to establish secure communication, used for authentication or used for access control. With one or more quantum keys and information provided by the trusted authority (101), a user device can securely communicate with another user device directly or over a public network (130) such as the Internet. Or, the user device can use a quantum key to authenticate itself to another user device or gain access to a facility through an access control device (120). Within the network of user devices that have each received quantum keys from QKD with the trusted authority, one user device can establish a secure connection with any other user device without QKD between the two user devices.

The trusted authority (101) can use one of its previously generated digital signature keys to sign a message to a user device, which can in turn use previously received (or recently gathered, e.g., in real time over the Internet from the trusted authority (101)) verification information to verify the identity of the trusted authority (101). A user device can use one of its previously generated digital signature keys to sign a message to another user device. The other user device can use previously received verification information to verify the identity of the first user device, or it can request such verification information from the trusted authority (101). In this role, the trusted authority (101) can verify the credentials of a user at various stages before distributing information regarding the user, to verify that credentials for the user have not been revoked.

A user device shown in FIG. 3 can acquire its quantum keys through any form of QKD with the trusted authority (101), with or without following a multi-factor authentication protocol as described herein. Some of the user devices shown in FIG. 3 acquired quantum keys directly through QKD with the trusted authority (101), as illustrated in FIG. 1. For example, the mobile phone (107) and QC card (102) acquired quantum keys from QKD with the trusted authority. The user computers (106) acquired quantum keys directly from a local connection to a conventional QC transmitter with a QKD link to the trusted authority. For such QKD, the device (102, 106 or 107) and trusted authority can follow a multi-factor authentication protocol to authenticate a user. Other user devices shown in FIG. 3 acquired quantum keys from a QC card, as shown in FIG. 2. For example, the satellite (118), mobile phone (117) and user computers (116) acquired quantum keys from a QC card (102). In any case, a user device can use its quantum keys at a location different than the location at which the quantum keys were distributed to the user device. Similarly, digital signature keys can be generated at a device or conveyed to the device, and verification information can be received at a device or conveyed to the device.

The trusted authority (101) is both a QC node (as in FIG. 1) and a conventional network contact point. Aside from QKD, acting in the role of a network server, the trusted authority (101) can exchange information using conventional network communication with a user device that acts in the role of a network client. In this way, the user device can receive information that is usable in combination with one of its stored quantum keys to establish a secure connection with another user device. Or, the user device can receive material from the trusted authority (101) that has been encrypted with one of its stored quantum keys. In addition to managing QKD (or performing QKD that is managed by another system), the trusted authority (101) can fill the role of certificate authority (e.g., generally to provide functions of a certificate directory) and registration authority in a Public Key Infrastructure ("PKI"). Likewise, the trusted authority (101) can act as a network client. Alternatively, another system fills the role of certificate authority and/or registration authority.

Quantum keys can facilitate secure communication even when the quantum keys are not used for algorithmic encryption. If two user devices have the same quantum keys, a first user device can use stored quantum keys to determine patterns to spread information content between wavelengths and/or time slots of a signal, then spread the information according to the patterns in transmission. The second user device determines the patterns from the stored quantum keys and de-spreads the information content from the signal it receives. The patterns depend on the stored quantum keys, but security is provided at the physical layer in transmission, not through use of the stored quantum keys in encryption.

When the quantum keys are used, the trusted authority (101) can be online or offline. For example, suppose two devices have each acquired quantum keys from QKD with the trusted authority (101). To establish a secure connection with a second user device, a first user device contacts the trusted authority (101) over a public network (130) such as the Internet. The first user device receives information from the trusted authority (101) that can be used, with a quantum key at the first user device, to establish a secure connection with the second user device. The first and second user devices can then use a joint session key for secure communication over the public network (130) or otherwise. When information from an online trusted authority (101) is needed to set up communication, an online trusted authority (101) can verify the credentials of a user before providing information about the user, so as to prevent secure communication from taking place when credentials for the user have been revoked.

Or, the trusted authority (101) can provide such information to the first user device and/or second user device, then go offline. Even though the trusted authority is offline, the first and second user devices can subsequently establish a secure connection over the public network (130) or directly with each other. In this case, however, the trusted authority (101) no longer provides verification of credentials.

In general, the information that the trusted authority (101) provides for use with the quantum keys can be provided in a non-secret way over the public network (130), since the information is only useful to the possessor of a quantum key. Section IV describes example protocols for secure multi-party communication. The example protocols can be used for secure communication, authentication, access control, and other applications in operating environments such as the example environment (300) of FIG. 3.

II. Example Mobile Devices with QC Card.

Figure 4:
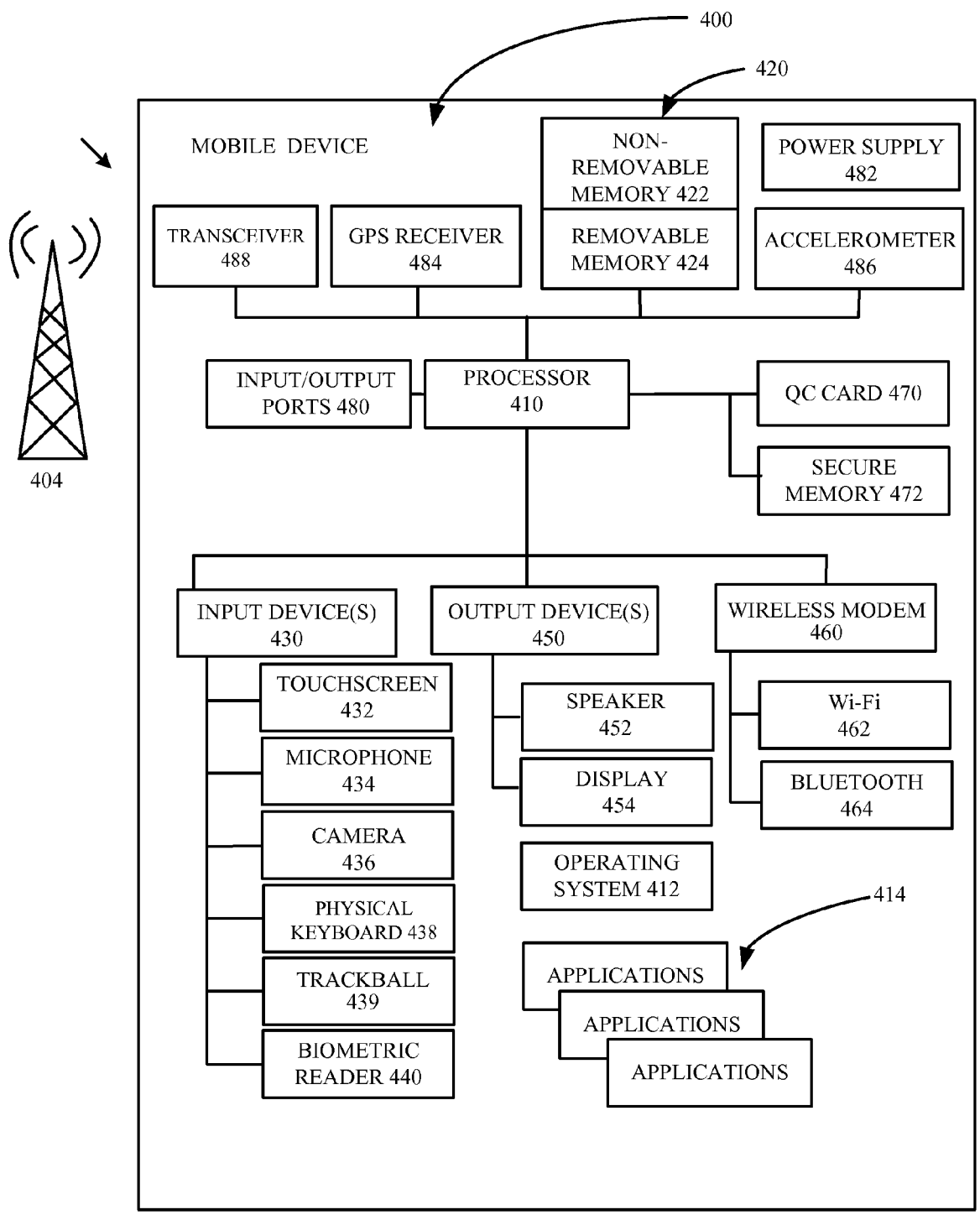
FIG. 4 is a block diagram of a mobile device that incorporates a QC card in some embodiments.

FIG. 4 is a system diagram depicting an exemplary mobile device (400) including a variety of optional hardware and software components. In general, a component in the mobile device can communicate with any other component, although not all connections are shown, for ease of illustration. The mobile device can be any of a variety of computing devices (e.g., cell phone, smartphone, handheld computer, personal digital assistant, etc.) and can allow wireless two-way communications with one or more mobile communications networks (404), such as a cellular or satellite network.

In particular, the mobile device (400) includes a QC card (470) and secure memory (472) for storing quantum keys. The secure memory (472) can also store digital signature keys, verification information, hash functions and/or encrypted versions of user passwords.

The illustrated mobile device can include a controller or processor (410) (e.g., signal processor, microprocessor, ASIC, or other control and processing logic circuitry) for performing such tasks as signal coding, data processing, input/output processing, power control, and/or other functions. An operating system (412) can control the allocation and usage of the components and provide support for one or more application programs (414). The application programs can include common mobile computing applications (e.g., include email applications, calendars, contact managers, web browsers, messaging applications), or any other computing application. In some scenarios, an application program uses one or more of the quantum keys stored in the secure memory (472) to encrypt and/or decrypt information that is communicated with the mobile device (400). Or, an application program uses one or more digital signature keys to sign a message. Or, an application program uses verification information to verify the identity of an originator of a message.

The illustrated mobile device can include memory (420). Memory (420) can include non-removable memory (422) and/or removable memory (424). The non-removable memory (422) can include RAM, ROM, flash memory, a disk drive, or other well-known memory storage technologies. The removable memory (424) can include flash memory or a Subscriber Identity Module card, which is well known in GSM communication systems, or other well-known memory storage technologies. The memory (420) can be used for storing data and/or code for running the operating system (412) and the applications (414). Example data can include web pages, text, images, sound files, video data, or other data sets to be sent to and/or received from one or more network servers or other mobile devices via one or more wired or wireless networks.

The mobile device can support one or more input devices (430), such as a touch screen (432), microphone (434), camera (436), physical keyboard (438) and/or trackball (439) and one or more output devices (450), such as a speaker (452) and a display (454). The touch screen (432) and/or camera (436) can provide rudimentary functionality for a biometric reader, or the mobile device (400) can include a dedicated biometric reader (440). Other possible output devices (not shown) can include a piezoelectric or other haptic output device. Some devices can serve more than one input/output function. For example, touch screen (432) and display (454) can be combined in a single input/output device.

A wireless modem (460) can be coupled to an antenna (not shown) and can support two-way communications between the processor (410) and external devices. The modem (460) is shown generically and can include a cellular modem for communicating with the mobile communication network (404) and/or other radio-based modems (e.g., BLUETOOTH™ or Wi-Fi). The wireless modem (460) is typically configured for communication with one or more cellular networks, such as a GSM network for data and voice communications within a single cellular network, between cellular networks, or between the mobile device and a public switched telephone network.

The mobile device can further include at least one input/output port (480), a power supply (482), a satellite navigation system receiver (484) such as a global positioning system receiver, an accelerometer (486), a transceiver (488) (for wirelessly transmitting analog or digital signals) and/or a physical connector (490), which can be a USB port, IEEE 1394 (firewall) port, and/or RS-232 port. The illustrated components are not required or all-inclusive, as components can be deleted and other components can be added. A quantum key stored in the secure memory (472) can be used to encrypt and/or decrypt information transmitted or received in non-quantum communication over a public channel using the modem (460), port (480), transceiver (488) or physical connector (490).

III. Example Computing Systems.

Figure 5:
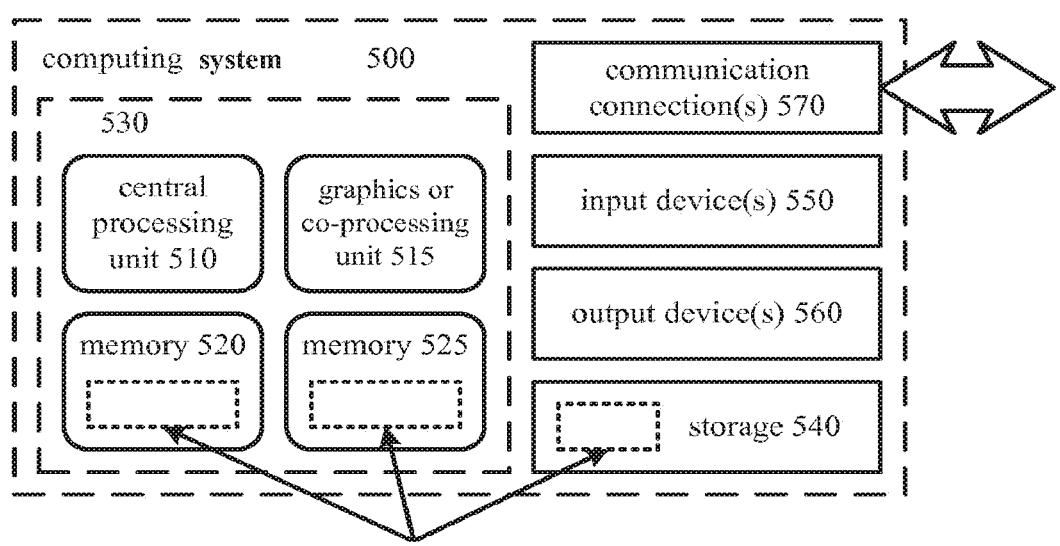
FIG. 5 is a block diagram of an example computing system in which some described embodiments can be implemented.

FIG. 5 illustrates a generalized example of a suitable computing system (500) in which several of the described innovations may be implemented. The computing system (500) is not intended to suggest any limitation as to scope of use or functionality, as the innovations may be implemented in diverse general-purpose or special-purpose computing systems. The computing system (500) can implement a trusted authority that provides a feature of the multi-factor authentication protocol innovations described herein. Or, the computing system (500) can implement a feature of the multi-factor authentication protocol innovations described herein in the role of a user device.

With reference to FIG. 5, the computing system (500) includes one or more processing units (510, 515) and memory (520, 525). In FIG. 5, this most basic configuration (530) is included within a dashed line. The processing units (510, 515) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 5 shows a central processing unit (510) as well as a graphics processing unit or co-processing unit (515). The tangible memory (520, 525) may be volatile memory (e.g., registers, cache, RAM), non-volatile memory (e.g., ROM, EEPROM, flash memory, etc.), or some combination of the two, accessible by the processing unit(s). The memory (520, 525) stores software (580) implementing one or more innovations for multi-factor authentication protocol using QC, in the form of computer-executable instructions suitable for execution by the processing unit(s).

A computing system may have additional features. For example, the computing system (500) includes storage (540), one or more input devices (550), one or more output devices (560), and one or more communication connections (570). An interconnection mechanism (not shown) such as a bus, controller, or network interconnects the components of the computing system (500). Typically, operating system software (not shown) provides an operating environment for other software executing in the computing system (500), and coordinates activities of the components of the computing system (500).

The tangible storage (540) may be removable or non-removable, and includes magnetic disks, magnetic tapes or cassettes, CD-ROMs, DVDs, or any other medium which can be used to store information in a non-transitory way and which can be accessed within the computing system (500). The storage (540) stores instructions for the software (580) implementing one or more innovations for a multi-factor authentication protocol using QC.

The input device(s) (550) may be a touch input device such as a keyboard, mouse, pen, or trackball, a voice input device, a scanning device, camera, or another device that provides input to the computing system (500). The output device(s) (560) may be a display, printer, speaker, CD-writer, or another device that provides output from the computing system (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (500), computer-readable media include memory (520, 525), storage (540), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

IV. Quantum Key Distribution that Facilitates Secure Multi-Part Communication.

Establishing shared secret session keys is a primary objective of secure communications. Use of the shared secret session keys enables users to achieve confidentiality and verify authenticity for their messages. Multiple protocols (e.g., Needham-Schroeder and Shoup-Rubin; key transport based on symmetric encryption; key agreement based on symmetric techniques) provide ways to establish shared secret session keys for a secure communications network of N users. In such protocols, each user has a secret pre-placed long-term key that is shared with a trusted authority. Pairs of users derive key encryption keys algorithmically from their long-term keys through additional communication with the trusted authority. The key encryption keys are then used to establish secret session keys between pairs of users.

Secure distribution of long term keys can be problematic. In practice, long-term keys can be distributed out-of-band, by courier, or by having each user bring his or her device into physical proximity of the trusted authority for direct delivery of the long-term key. Such methods of distributing long-term keys are cumbersome and susceptible to compromise. Alternatively, public key cryptography could be used for distribution of long-term keys, but public key cryptography is susceptible to archival attack.

Moreover, aside from distribution of long-term keys, because key encryption keys are derived algorithmically from long term keys, these protocols lack forward security. If a long-term key is compromised, or if the cryptographic algorithm used to derive key encryption keys from long-term keys is broken, the secrecy of subsequent keys is not assured since the subsequent keys can be predicted from known previous keys.

Protocols described below use QKD to provide keys to users. Pre-placement of long-term keys out-of-band, by courier, by public key cryptography or by delivery in close physical proximity is not required.

A. Example Protocols for QKD Between Trusted Authority and Users

FIG. 6 illustrates a generalized example protocol (600) including QKD between a trusted authority and one or more user devices to establish keys for secure multi-party communication. Through the protocol (600), each of multiple users performs QKD (e.g., point-to-point QKD or other QKD) with a trusted authority to establish keys with forward secrecy. The trusted authority also provides each user with a non-secret look-up table from which the keys of other users can be derived. User-to-user QKD is not required, yet many of the benefits and advantages of QKD are retained in user-to-user communication.

FIG. 6 details operations between a first user device ("user device 1") and the trusted authority. The authentication and QKD operations are repeated between the trusted authority and each of N user devices i, for $1 \leq i \leq N$. Alternatively, the trusted authority establishes keys with a device that acts as a fillgun, eventually distributing the keys to a user device for secure multi-party communication with one or more other user devices. Without loss of generality, for the sake of presentation, the operations of the protocol (600) are described with reference to a user device.

Authentication with Pre-Placed Key.

The first user device receives biometric indicia B for the user. For example, the biometric indicia are fingerprint scan data. Instead of or in addition to the biometric indicia, the user device can accept and encrypt keystroke input for a personal identification number. The first user device encrypts the biometric indicia B using an encryption algorithm E[a; b]. For example, the first user device uses a short pre-placed authentication key $AK_0(1)$ for the first session of QKD with the trusted authority. The encryption algorithm E[a; b] can be a symmetric key encryption algorithm of information a with key b, such as AES (see FIPS 197 "The Advanced Encryption Standard (AES)") or another encryption algorithm. Generally, the encrypted authentication information is sent over a non-secure network such as a public network. The trusted authority receives the encrypted authentication information and decrypts it using the appropriate algorithm (e.g., symmetric key encryption algorithm) and pre-placed authentication key $AK_0(1)$ of the first user device. The trusted authority compares the received authentication information with previously provided identification information for the first user and, if appropriate, authenticates the user.

Multi-Factor Authentication.

Alternatively (not shown in FIG. 6), the first user device and trusted authority can engage in multi-factor authentication using QC as described in Section VI to authenticate the user.

QKD after Authentication with Pre-Placed Key.

Assuming the user has been authenticated, the first user device and trusted authority perform QKD to generate a secret random bit sequence that is parsed into keys. For example, the user device and trusted authority generate N−1 secret independent encryption keys and N−1 secret independent key derivation keys, which are shared by the user device and the trusted authority, and which are stored in secure memory at trusted authority and user device. In example implementations, the shared bit series is parsed into the following keys by both the trusted authority and user device i:

N−1 encryption keys K(i,j) for $j \neq i$,
N−1 key derivation keys L(i,j) for $j \neq i$,
a key authentication key M(i) and
a fresh authentication key $AK_x(i)$.

The encryption keys K(i,j), key derivation keys L(i,j), and key authentication key M(i) can have 256 bits per key or some other number of bits per key. FIG. 6 shows distribution of shared encryption keys K(1, j), derivation keys L(1, j), a key authentication key M(1) and a fresh authentication key $AK_1(1)$ for the first user device. The encryption keys K(1, j), key derivation keys L(1, j) and key authentication key M(1) are used as described below. The initial authentication key $AK_0(1)$ of the first user device no longer needs to be kept secret. It is replaced with a fresh authentication key $AK_1(1)$ produced in the QKD, for use in authenticating the user in a future QKD session with the trusted authority.

In contrast to conventional approaches that require placement of long-term keys out-of-band, by courier or by close physical proximity, starting from a short pre-placed secret authentication key $AK_0(i)$, QKD provides an essentially unconstrained ability to generate new secret bit strings shared by the trusted authority and user i. In addition, the new secret bit strings for K(i,j), L(i,j), M(i) and $AK_x(i)$ have no algorithmic dependence on the pre-placed authentication key $AK_0(i)$.

According to the protocol (600) shown in FIG. 6, the trusted authority repeats the authentication and QKD for each of one or more other user devices. Thus, using his or her pre-placed authentication key $AK_0(i)$, each user i, for $1 \leq i \leq N$, establishes a QKD session with the trusted authority and establishes shared keys with the trusted authority.

QKD as part of Multi-factor Authentication.

Alternatively (not shown in FIG. 6), the first user device and trusted authority can perform QKD as part of multi-factor authentication using QC as described in Section VI. In this case, the first user device and trusted authority perform QKD to generate a secret random bit sequence that is parsed into keys. For example, the user device and trusted authority generate N−1 secret independent encryption keys and N−1 secret independent key derivation keys, which are shared by the user device and the trusted authority, and which are stored in secure memory at trusted authority and user device. In example implementations, the shared bit series is parsed into the following keys by both the trusted authority and user device i:

N−1 encryption keys K(i,j) for $j \neq i$,
N−1 key derivation keys L(i,j) for $j \neq i$, and
a key authentication key M(i).

The encryption keys K(i,j), key derivation keys L(i,j), and key authentication key M(i) can have 256 bits per key or some other number of bits per key. The encryption keys K(1, j), key derivation keys L(1, j) and key authentication key M(1) are used as described below. The trusted authority can repeats the authentication and QKD for each of one or more other user devices.

Generation of Pair Keys and Key Authentication Values.

Following QKD with the N user devices, the trusted authority stores the encryption keys K(i,j), key derivation keys L(i,j), and key authentication key M(i) for the N user devices, and each of the N user devices i stores the encryption keys K(i,j), key derivation keys L(i,j), and key authentication key M(i) for that user device i. Typically, the keys are stored in secure memory. For example, if there are five user devices, the trusted authority stores encryption keys and key derivation keys as follows.

| K(i, j) | i = 1 | i = 2 | i = 3 | i = 4 | i = 5 |
|---|---|---|---|---|---|
| j = 1 | — | $k_{2,1}$ | $k_{3,1}$ | $k_{4,1}$ | $k_{5,1}$ |
| j = 2 | $k_{1,2}$ | — | $k_{3,2}$ | $k_{4,2}$ | $k_{5,2}$ |
| j = 3 | $k_{1,3}$ | $k_{2,3}$ | — | $k_{4,3}$ | $k_{5,3}$ |
| j = 4 | $k_{1,4}$ | $k_{2,4}$ | $k_{3,4}$ | — | $k_{5,4}$ |
| j = 5 | $k_{1,5}$ | $k_{2,5}$ | $k_{3,5}$ | $k_{4,5}$ | — |

| L(i, j) | i = 1 | i = 2 | i = 3 | i = 4 | i = 5 |
|---|---|---|---|---|---|
| j = 1 | — | $l_{2,1}$ | $l_{3,1}$ | $l_{4,1}$ | $l_{5,1}$ |
| j = 2 | $l_{1,2}$ | — | $l_{3,2}$ | $l_{4,2}$ | $l_{5,2}$ |
| j = 3 | $l_{1,3}$ | $l_{2,3}$ | — | $l_{4,3}$ | $l_{5,3}$ |
| j = 4 | $l_{1,4}$ | $l_{2,4}$ | $l_{3,4}$ | — | $l_{5,4}$ |
| j = 5 | $l_{1,5}$ | $l_{2,5}$ | $l_{3,5}$ | $l_{4,5}$ | — |

And each user device i stores the encryption keys and key derivation keys from one of the columns of the tables.

Returning to FIG. 6, the trusted authority determines pair keys P(i,j) and key authentication values A(i,j). Each of the pair keys and each of the key authentication values is specific to pair-wise communication between a user device i and user device j. In the example implementations, the trusted authority computes the keys P(i,j) and key authentication values A(i, j) as follows:

$$P(i,j) = L(i,j) \oplus K(j,i) \text{ for } 1 \leq i,j \leq N, \text{ and } i \neq j,$$

$$A(i,j) = H[K(j,i); M(i)] \text{ for } 1 \leq i,j \leq N, \text{ and } i \neq j,$$

where ⊕ indicates a bitwise XOR operation, and H[a; b] indicates a keyed hash function of input a with key b. For example, the keyed hash function H[a; b] is a keyed cryptographic hash function such as HMAC-SHA-256 (see FIPS 198 "The Keyed-Hash Message Authentication Code (HMAC)") or other keyed hash function. Alternatively, the hash function H[ ] is another type of hash function that is not a keyed hash function. The pair keys and key authentication values can each have 256 bits or some other number of bits. The trusted authority can organize the pair keys and key authentication values as two look-up tables or with other data structures. For example, if there are five user devices, the trusted authority determines pair keys and key authentication values as follows from the encryption keys and key derivation keys shown above.

The pair keys P(i,j) and key authentication values A(i,j) need not be kept secret. Generally, the trusted authority makes the pair keys P(i,j) and key authentication values A(i,j) available for distribution to the respective user devices over a non-secure network such as a public network. A given user device i retrieves the pair keys P(i,j) and key authentication values A(i,j) that it uses. For example, the first user device of FIG. 6 retrieves the pair keys P(1,j) and key authentication values A(1, j) specific to the first user device. The user devices can retrieve and store the pair keys and key authentication values for use during later communication between user devices even if the trusted authority is offline. Or, if the trusted authority is online during later communication between user devices, a user device i can retrieve the pair keys and key authentication values for the device i at the time of communication, or it can retrieve only the key and authentication value specific to communication from user device i to user device j from the online trusted authority.

As explained in WO 2012/044855, from his key derivation key L(i,j) and from a pair key P(i,j) provided by the trusted authority, a user device i can derive the encryption key K(j, i) that another user device j uses in communication with the user device i. From his key authentication key M(i) and the key authentication value A(i,j) provided by the trusted authority, the user device i can verify that the encryption key K(j, i) is authentic. The user device j can similarly derive and authenticate the encryption key K(i,j) of the user device i. Using one or both of the encryption keys, the two user devices can establish one or more shared secret session keys for communications between them.

Because the encryption keys and key derivation keys are generated by QKD, they are independent and do not depend on any pre-placed secret. As such, the protocol (600) shown in FIG. 6 provides strong forward security that is superior to conventional protocols for multi-party communication. Furthermore, fresh encryption keys and key derivation keys can be generated in future QKD sessions between user devices and the trusted authority. Moreover, additional users can be added to the communication network by the trusted authority. For this purpose, the trusted authority can assign extra encryption keys and key derivation keys for a given user device i for use with to-be-determined new user devices, distribute encryption keys and key derivation keys by QKD

| P(i, j) | i = 1 | i = 2 | i = 3 | i = 4 | i = 5 |
|---|---|---|---|---|---|
| j = 1 | — | $l_{2,1} \oplus k_{1,2}$ | $l_{3,1} \oplus k_{1,3}$ | $l_{4,1} \oplus k_{1,4}$ | $l_{5,1} \oplus k_{1,5}$ |
| j = 2 | $l_{1,2} \oplus k_{2,1}$ | — | $l_{3,2} \oplus k_{2,3}$ | $l_{4,2} \oplus k_{2,4}$ | $l_{5,2} \oplus k_{2,5}$ |
| j = 3 | $l_{1,3} \oplus k_{3,1}$ | $l_{2,3} \oplus k_{3,2}$ | — | $l_{4,3} \oplus k_{3,4}$ | $l_{5,3} \oplus k_{3,5}$ |
| j = 4 | $l_{1,4} \oplus k_{4,1}$ | $l_{2,4} \oplus k_{4,2}$ | $l_{3,4} \oplus k_{4,3}$ | — | $l_{5,4} \oplus k_{4,5}$ |
| j = 5 | $l_{1,5} \oplus k_{5,1}$ | $l_{2,5} \oplus k_{5,2}$ | $l_{3,5} \oplus k_{5,3}$ | $l_{4,5} \oplus k_{5,4}$ | — |

| A(i, j) | i = 1 | i = 2 | i = 3 | i = 4 | i = 5 |
|---|---|---|---|---|---|
| j = 1 | — | $H[k_{1,2}; M(2)]$ | $H[k_{1,3}; M(3)]$ | $H[k_{1,4}; M(4)]$ | $H[k_{1,5}; M(5)]$ |
| j = 2 | $H[k_{2,1}; M(1)]$ | — | $H[k_{2,3}; M(3)]$ | $H[k_{2,4}; M(4)]$ | $H[k_{2,5}; M(5)]$ |
| j = 3 | $H[k_{3,1}; M(1)]$ | $H[k_{3,2}; M(2)]$ | — | $H[k_{3,4}; M(4)]$ | $H[k_{3,5}; M(5)]$ |
| j = 4 | $H[k_{4,1}; M(1)]$ | $H[k_{4,2}; M(2)]$ | $H[k_{4,3}; M(3)]$ | — | $H[k_{4,5}; M(5)]$ |
| j = 5 | $H[k_{5,1}; M(1)]$ | $H[k_{5,2}; M(2)]$ | $H[k_{5,3}; M(3)]$ | $H[k_{5,4}; M(4)]$ | — | with a new user device when the new user device is added, and update the pair keys and key authentication values for distribution.

Keys established using QKD can be used to facilitate secure multi-party communication. Example implementations of secure multi-party communication facilitated with key derivation keys, encryption keys, key authentication keys, pair keys and key authentication values are detailed in U.S. patent application Ser. No. 12/895,367, filed Sep. 30, 2010, and PCT Patent Application No. PCT/US2011/054070, filed Sep. 29, 2011, which has been published as WO 2012/044855. These applications also detail approaches to group keying.

Figure 7:
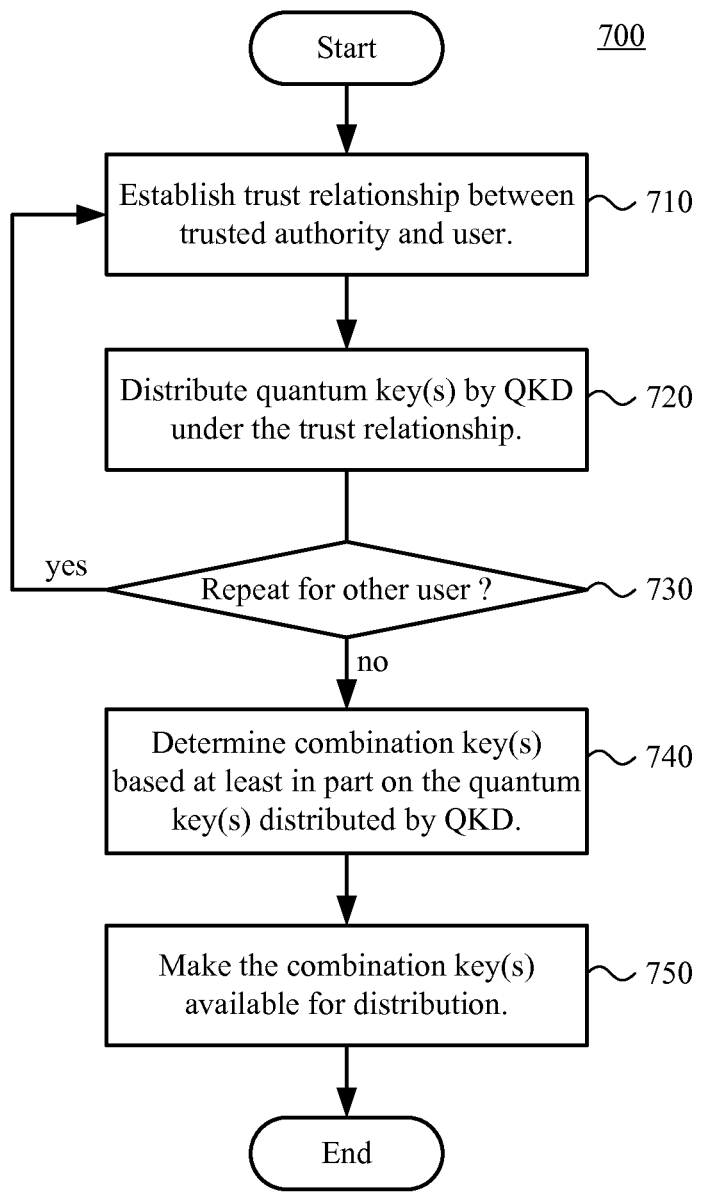
FIG. 7 is a flowchart illustrating a generalized technique for key distribution including QKD between a trusted authority and one or more user devices for secure multi-party communication.

B. Generalized Techniques for QKD that Facilitates Secure Multi-Party Communication FIG. 7 shows a generalized technique (700) for key distribution between a trusted authority and one or more user devices to distribute keys for secure multi-party communication. A computing system that implements a trusted authority performs the technique (700).

The trusted authority establishes (710) a trust relationship between the trusted authority and a user. For example, the trusted authority authenticates the user using biometric indicia and/or personal identification information (e.g., a PIN) provided by the user to establish the trust relationship. In some implementations, the biometric indicia and/or personal identification information are encrypted before transmission to the trusted authority over a public channel. The encryption uses a previously placed secret key, which can be replaced with another secret key from the results of QKD, for use in authentication before a subsequent QKD session. Alternatively, the trusted authority establishes the trust relationship using another mechanism.

After the trust relationship is established, the trusted authority distributes (720) one or more quantum keys by QKD under the trust relationship between the trusted authority and user. In this QKD, the quantum key(s) can be directly provided to a user device of the user. Or, the quantum key(s) can be provided to a fillgun device that subsequently provides the quantum key(s) to a user device of the user. Quantum keys distributed by QKD are randomly generated and, therefore, assumed to be different from user to user. Each quantum key is, in literal terms, a series of binary values. The definitions of the quantum keys depend on the scenario in which the quantum keys are used. Example scenarios are discussed below.

Alternatively, multi-factor authentication that uses QC (as described in Section VI) is used in place of stages (710) and (720) to distribute quantum key(s) by QKD.

The trusted authority (730) determines whether to repeat these acts for QKD for another user and, if so, continues by establishing (710) a trust relationship with another user. In this way, the trusted authority distributes different quantum keys for use by users (user devices) in secure multi-party communication.

Subsequently, the trusted authority determines (740) one or more combination keys based at least in part on the quantum keys distributed by the trusted authority. In particular, the trusted authority determines a combination key from a quantum key distributed for a first user (first user device) and a quantum key distributed for a second user (second user device), where the combination key is adapted for communication between the first user device and the second user device. For example, the first user device can use the combination key, in combination with the quantum key distributed for the first user device, to determine the quantum key distributed for the second user device. A combination key is, in literal terms, a series of binary values. The definition of the combination key depends on the scenario in which the combination key is generated and used. Example scenarios are discussed below.

The trusted authority makes the combination key(s) available (750) for distribution to the user devices. In this way, the trusted authority facilitates secure communication between the respective users, even in the absence of QKD directly between the user devices. The ways that combination keys are organized and delivered depend on implementation. For example, the combination keys are organized as a look-up table that is made available for non-secret distribution over the Web or another public channel. Or, even though the combination keys need not be kept secret, some or all of the combination keys are provided to the respective user devices over a non-public channel. Alternatively, the combination keys are organized and/or delivered using another mechanism.

In some scenarios, a quantum key for a first user (first user device) is a key derivation key, and a quantum key for a second user (second user device) is an encryption key for the second user device. For example, in terms of the example protocols explained with reference to FIG. 6, the key derivation key is a key $L(1, 2)$ for user device 1, and the encryption key is a key $K(2, 1)$ for user device 2. The combination key is a pair key $P(1, 2)$ computed as the bitwise XOR of $L(1, 2)$ and $K(2, 1)$. Alternatively, the combination key is determined using another mechanism. In general, for any two user devices, the role of the user device having the encryption key and the user device having the key derivation key can be switched to change which user device derives the encryption key of the other.

In other scenarios, the quantum keys for a first user (first user device) include a first key derivation key and an encryption key for the first device. The quantum keys for a second user (second user device) include a second key derivation key and an encryption key for the second user device. The trusted authority determines a first combination key from the first key derivation key and the encryption key for the second user device, and it determines a second combination key from the second key derivation key and the encryption key for the first device. For example, in terms of the example protocols explained with reference to FIG. 6, the first quantum keys include $L(1, 2)$ and $K(1, 2)$ for user device 1, and second quantum keys include $L(2, 1)$ and $K(2, 1)$ for user device 2. Pair key $P(1, 2)$ is the bitwise XOR of $L(1, 2)$ and $K(2, 1)$, and pair key $P(2, 1)$ is the bitwise XOR of $L(2, 1)$ and $K(1, 2)$. Alternatively, combination keys are determined using another mechanism. Thereafter, the first user device can determine the encryption key of the second user device from the first combination key and first key derivation key. Similarly, the second user device can determine the encryption key of the first user device from the second combination key and second key derivation key.

In any of these scenarios, the number of quantum keys distributed can be increased to accommodate communication with more users and user devices. The trusted authority can update the combination keys when more users are added to the network. The trusted authority can resupply users with new quantum keys as needed, updating combination keys accordingly.

In addition to determining and distributing combination keys, the trusted authority can distribute key authentication keys and key authentication values for authentication of user devices. For example, the quantum keys distributed for a user include a key authentication key for the user (user device). In terms of the example protocols explained with reference to FIG. 6, M(1) is an example of a key authentication key in the quantum keys for user device 1, and M(2) is an example of a key authentication key in the quantum keys for user device 2. The trusted authority creates one or more key authentication values that are made available for distribution. For example, the trusted authority determines a key authentication value using a cryptographic hash function of a key authentication key for one user device and an encryption key for another user device. Alternatively, the key authentication value is created using another mechanism. Thereafter, the first user device can use its key authentication key and the key authentication value to check the value of an encryption key it has derived for the other user device.

C. Example Password-Based Authentication Using a QIP

Password-based authentication using a quantum identification protocol ("QIP") can be performed between a given user device and trusted authority before beginning one of the above-described QKD protocols. For example, password-based authentication using a QIP is used to generate an initial authentication key (instead of using a pre-placed authentication key), and then one of the above-described QKD protocols is used to perform QKD between the trusted authority and user device to establish keys for secure multi-party communication or another purpose.

In password-based authentication using a QIP, a password w(i) for a user i is shared with the trusted authority. Different users have different passwords. The trusted authority stores the different passwords for the respective users in secure memory in the system that implements the trusted authority. The password w(i) is used for authentication between the trusted authority and a user i, but the password w(i) is not itself communicated between the user i and trusted authority, even in encrypted form. As such, information about the password w(i) is not revealed according to the QIP, and the password may be used multiple times without compromising security.

The constituent parts of a password w(i) depend on implementation. For example, a password w(i) can include: (1) a part that is input by the user i and is relatively easy for the user to memorize (such as a series of 8 to 12 alphanumeric characters or special ASCII characters on a conventional keyboard), (2) a part that is stored in secure memory on the user device (such as a longer string of random bits defining a high entropy key), and/or (3) a part that represents a digest of biometric indicia (such as fingerprint scan data) provided by the user i. Alternatively, the password w has other and/or additional parts.

For authentication between the user i and trusted authority, the password w(i) is used within a QIP to convince the trusted authority that the user is not an imposter, and to prevent an honest user from establishing quantum keys with a fake trusted authority. If a fake trusted authority cannot impersonate a real trusted authority, the fake trusted authority cannot convince an authorized user to perform QKD with the fake trusted authority. For example, as part of the QIP:

a user device for user i generates a string of random bits, encodes the bits as quantum states according to randomly assigned bases (e.g., rectilinear or diagonal), and transmits (via quantum channel) such quantum state information to the trusted authority;

the trusted authority receives the quantum state information and measures quantum states according to a pattern of bases that depends on the password w(i) (e.g., using a pattern of rectilinear/diagonal measuring bases selected as a function of the password w(i));

the user device i selects a first hash function to be applied to shared secret bits from the QIP, and the user device transmits (via conventional channel) an indication of the first hash function to the trusted authority along with the pattern of sending bases it used in quantum transmission;

the user device i and trusted authority each determine shared secret bits for the QIP as those bits for which sending basis matched measuring basis (the user device itself determines the pattern of measuring bases from the password w(i));

the trusted authority selects a second hash function to be applied to the password w(i), and the trusted authority transmits (via conventional channel) an indication of the second hash function to the user device i along with a message authentication code that depends on part (e.g., high entropy key) of the password w(i);

the user device i authenticates the trusted authority based on the message authentication code and its stored version of the part (e.g., high entropy key) of the password w(i);

the user device i computes a check value based on (a) application of the first hash function to its version of the shared secret bits and (b) application of the second hash function to the password w(i), and the user device transmits (via conventional channel) the check value to the trusted authority; and the trusted authority computes its own version of the check value and compares it to the check value received from the user device i, so as to authenticate the user device.

For additional details about variations of QIPs, see, e.g., Damgard et al., "Secure Identification and QKD in the Bounded-Quantum-Storage Model," Crypto 2007, Lecture Notices Computer Science 4622, pages 342-359 (2007).

In the QIP, the string of secret bits determined by the user device i will match the string of secret bits determined by the trusted authority only if the trusted authority has the password w(i) and the user device has the password w(i). Otherwise, the pattern of measuring bases determined at the trusted authority will not match the pattern of measuring basis determined at the user device i. Moreover, without betraying details of the password w(i), the QIP allows the trusted authority to verify the user's identity and convinces the user that the trusted authority is legitimate.

The secret random bits that result from the QIP can be used to generate an initial authentication key $AK_0$ to use for authentication of the user when establishing quantum keys with the trusted authority. The secret bits that result from the QIP are shared by the user device and trusted authority. Some or all of the secret bits can be directly used to form the key $AK_0$, or some or all of the secret bits can be hashed to form the key $AK_0$. The user device and trusted authority then use the key $AK_0$ to initiate QKD to establish keys for secure multi-party communication or another purpose according to one of the above-described QKD protocols. One of the keys established in QKD can be used to update part of the password w(i) (e.g., to replace the high entropy key in secure memory at the user device and trusted authority) instead of updating the key $AK_0$. Or, the same password w(i) can simply be reused for future authentication. Alternatively, password-based authentication using a QIP is itself used to establish a trust relationship between the trusted authority and given user (instead of later authentication using an initial authentication key $AK_0$).

Password-based authentication using a QIP can provide security in the event of loss of a user device. Without the part of a password that a user provides as input (or without the biometric indicia that the user provides as input), a non-authorized user cannot convince the trusted authority to accept him as the authorized user of the device, and the non-authorized user is unable to use the device to perform QKD with the trusted authority.

D. Example Hierarchy of Trusted Authorities

In the above-described QKD protocols, a trusted authority establishes keys by QKD with each of multiple users. A trusted authority can be part of a hierarchy of trusted authorities, in which case the trusted authority establishes keys with a sub-network of one or more users. Users associated with different trusted authorities can establish shared secret keys through an intermediary trusted authority in the hierarchy.

For example, a hierarchy includes two child trusted authorities and a parent trusted authority that acts as an intermediary. The first child trusted authority is associated with one or more users in a first sub-network. In particular, the first child trusted authority distributes keys by QKD under a trust relationship with a first user in the first sub-network. The second child trusted authority is associated with one or more users in a second sub-network. In particular, the second child trusted authority distributes keys by QKD under a trust relationship with a second user in the second sub-network.

The first child trusted authority is also operable to engage in QKD with the parent trusted authority. (And the second child trusted authority is operable to engage in QKD with the parent trusted authority.) The first child trusted authority retrieves keys that result from QKD with the parent trusted authority, and the first child trusted authority uses one of the keys from QKD with the parent trusted authority (and one of the keys from QKD with the first user) to facilitate secure communication between the first user and second user.

For example, the first child trusted authority receives an encrypted session key from the parent trusted authority and decrypts the encrypted session key using one of its keys from QKD with the parent trusted authority. The first child trusted authority re-encrypts the session key using one of its keys from QKD with the first user, and distributes the re-encrypted session key to the first user device. Similarly, the second child trusted authority receives an encrypted version of the session key from the parent trusted authority, decrypts the encrypted session key using one of its keys from QKD with the parent trusted authority, re-encrypts the session key using one of its keys from QKD with the second user, and distributes the re-encrypted session key to the second user device. Each of the first and second user devices decrypts the encrypted session key using its key from QKD with its trusted authority, then uses the session key for secure communication or another purpose. More generally, following one of the group keying protocols described in WO 2012/044855, the parent trusted authority can operate as a group leader, with each of the child trusted authorities operating as a sub-group leader. In this configuration, the respective trusted authorities are separate physical nodes that perform QKD with other nodes and user devices, not just separate logical nodes.

Alternatively, instead of using keys established by QKD to share session keys, a child trusted authority uses combination keys together with keys established by QKD to facilitate secure communication between users. For example, a first child trusted authority retrieves an authority-to-authority combination key that is distributed by the parent trusted authority. The authority-to-authority combination key (as a pair key) is based on one of the keys from QKD between the first child trusted authority and the parent trusted authority, and it is also based on a key from QKD between the second child trusted authority and the parent trusted authority. The first child trusted authority uses the authority-to-authority combination key (as a pair key) and its key from QKD with the parent trusted authority to derive the key for the second child trusted authority. The first child trusted authority then communicates with the second child trusted authority to determine a user-to-user combination key. The user-to-user combination key (as a pair key) is based on one of the keys from QKD with the first user and is also based on one of the keys for the second user (from QKD between the second user and second child trusted authority). The first child trusted authority makes the user-to-user combination key available for distribution to the first user device, which can use the user-to-user combination key and its key from QKD with the first child trusted authority to determine the key for the second user device.

In the preceding examples, one parent trusted authority is an intermediary between two child trusted authorities in a hierarchy. Alternatively, the hierarchy includes more trusted authorities at a given level and/or more levels of trusted authorities.

E. Example Distributed Trusted Authority Functions

A computing system implements the role of a trusted authority, and the computing system can be located at a single physical location or distributed among multiple physical locations. The above-described QKD protocols can be implemented in a configuration in which the functions of a trusted authority are distributed across multiple physical nodes. Distribution of trusted authority functions across multiple physical nodes can help protect against failure or compromise of any given one of the nodes.

If the functions of a trusted authority are associated with a single physical node, the single node constitutes a single point of potential failure or compromise. To mitigate this risk, quantum secret sharing can be used to distribute the functions of a trusted authority across two or more physical nodes. Instead of QKD between a user device and single physical node for the trusted authority, the user device performs quantum secret sharing with the multiple physical nodes constituting the trusted authority. For example, a first user device uses quantum secret sharing to facilitate first QKD for a first user and the multiple physical nodes of the trusted authority; and a second user device uses quantum secret sharing to facilitate second QKD for a second user and the multiple physical nodes of the trusted authority. For details about variations of quantum secret sharing, see, e.g., Hillery et al., "Quantum Secret Sharing," Physical Review A, vol. 59, no. 3, pages 1829-1834 (1999). In this way, loss or compromise of any single physical node of the trusted authority does not prevent or compromise key establishment between users. Also, when a user's password is stored across multiple physical nodes of the trusted authority (as in examples of multi-factor authentication described in section VI), another advantage is that compromise of all physical nodes of the trusted authority would be required to compromise the system (i.e., for an adversary to gain the user's password).

V. Signature Keys and Verification Information.

As part of multi-factor authentication using QC, a trusted authority can use digital signature keys at various stages. In some examples in this section, the primary parties of interest are the trusted authority, a first user (of a first user device) and a second user (of a second user device). Typically, the trusted authority acts in the role of registration authority and certificate authority. Alternatively, however, the roles of trusted authority, registration authority and certificate authority can be split among different entities connected through trust relationships. The trusted authority can be a single trusted authority or hierarchy of trusted authorities.

In these examples, certain assumptions are made about infrastructure. The trusted authority and first user share a classical channel and quantum channel. The trusted authority and second user also share a classical channel and quantum channel. The first and second users share a classical channel only.

A. Example Signature Keys and Verification Information

In example implementations, the digital signature keys are Winternitz one-time digital signature keys (whose basis is a Lamport-Diffie one-time signature scheme), and the verification information is a signature verification key at the root of a Merkle hash tree. Details about generation and use of Winternitz one-time digital signature keys, Merkle hash trees, and Merkle signature schemes can be found in many references. For example, see Becker, "Merkle Signature Schemes, Merkle Trees and Their Cryptanalysis" (2008). A Merkle signature scheme can be implemented using a Coronado Merkle signature scheme ("CMSS"), XMSS or other approach.

Figure 8A:
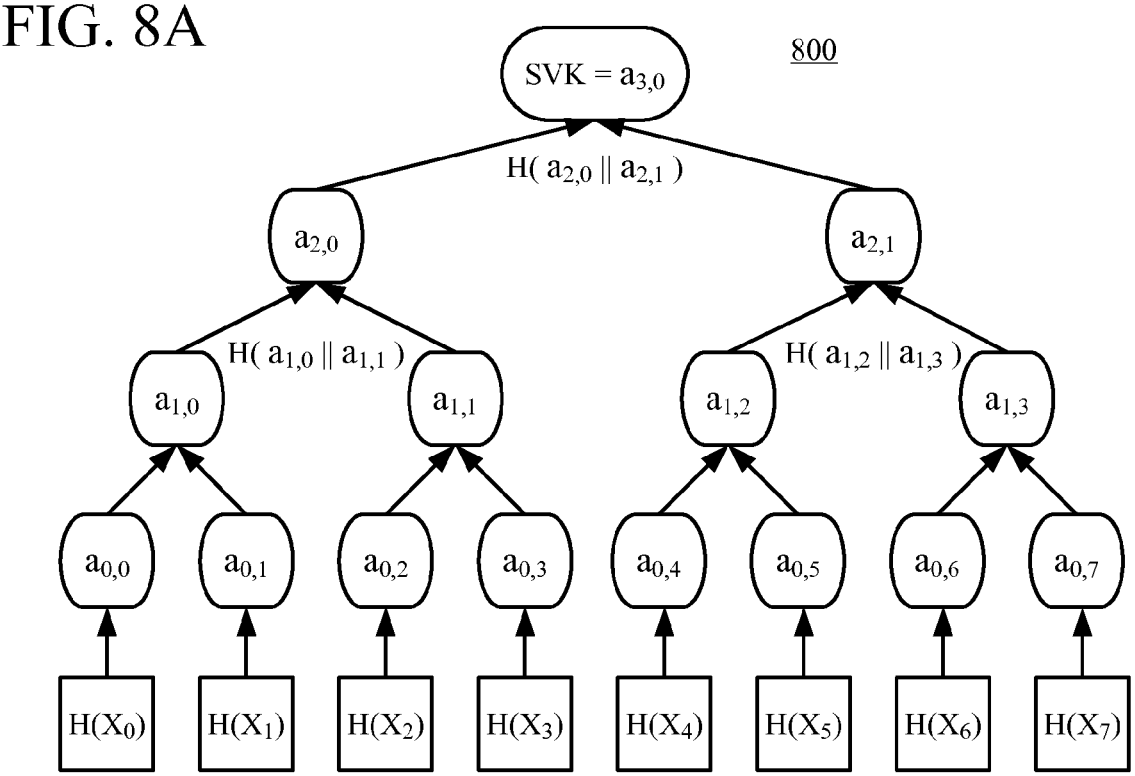
FIGS. 8a and 8b are diagrams illustrating features of an example Merkle hash tree.

FIG. 8a shows an example Merkle hash tree (800) with 8 leaf nodes, and illustrates aspects of key generation and generation of verification information. In practice, a Merkle tree usually has more nodes (e.g., 512 leaf nodes or 1024 leaf nodes). In FIG. 8a, a node is labeled $a_{i,j}$, where i indicates the level of the node in the hash tree, and j indicates the position of the node at that level (numbered left to right in FIG. 8a).

For each leaf node j, a Winternitz one-time digital signature key $X_j$ is generated (e.g., using a random number generator) and hashed. In general, the hash function H( ) is a cryptographically secure one-way hash function, and need not be the same as the hash function used elsewhere herein. Typically, the hash function is computationally simple and lightweight, making the entire Merkle hash tree computationally simple and lightweight.

The values at two adjacent leaf nodes are in turn hashed using the hashing function, as shown in FIG. 8a. For example, the values at nodes $a_{0,0}$, and $a_{0,1}$ are hashed to produce a value at node $a_{1,0}$. At the next level up, the values at adjacent nodes are again hashed using the hashing function, as shown in FIG. 8a. For example, the values at nodes $a_{1,0}$ and $a_{1,1}$ are hashed to produce a value at node $a_{2,0}$. This process continues until the value of the root node is determined. The root node of the Merkle hash tree (800) is the signature verification key ("SVK"). The SVK is an example of verification information, in that it is used to check the identification or certification of a message signed with any of the one-time digital keys $X_j$ in the tree (800). The verification information (here, the SVK for the Merkle hash tree) can be distributed in a way that is secure, as described below, and in a way that the creator of the verification information is authenticated, as described below.

Figure 8B:
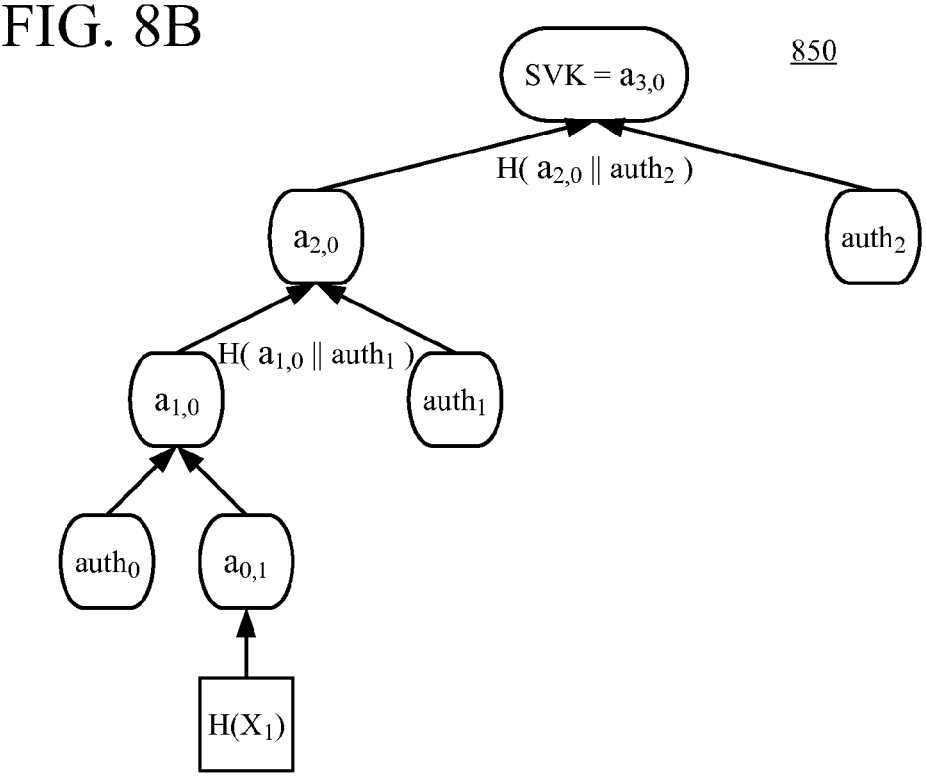

When one of the digital signature keys $X_j$ is used, the entity that generated the digital signature key (e.g., user device, trusted authority) signs a message using the digital key. The signed message sig is transmitted, including information that identifies the leaf node for that key $X_j$ and provides authentication values for the path of the leaf node up to the SVK. For example, if the key $X_1$ is used, the signature information includes the signature value resulting from application of the key $X_1$ to the message along with authentication values for intermediate nodes along the path up to the SVK. In FIG. 8b, the authentication values for the intermediate nodes are shown as $auth_0$, $auth_1$ and $auth_2$.

FIG. 8b shows aspects of key verification for the Merkle hash tree (850), which corresponds to the tree (800) of FIG. 8a. With the signature value and authentication values, the recipient can reconstruct an appropriate value $H(X_j)$ for the leaf node and determine hashed values at successively higher levels of the tree. For example, the recipient hashes the signature value sig using a related variation H"( ) of the hash function H(), so as to determine the value H"(sig). H"(sig) is expected to be equal to $H(X_i)$ for verification to succeed, even though the recipient does not have the secret signature key $X_i$. The recipient then hashes that value H"(sig) with an authentication value for the intermediate node for the appropriate level, repeating the process level after level with the result of the prior hashing operation and the authentication value for the next intermediate node, to locally determine the root node SVK. The recipient can then compare the locally determined SVK at the root node with the previously received SVK. If the values match, the signature is verified. For example, in FIG. 8b, the recipient reconstructs the value $H(X_1)$ for node $a_{0,1}$ (actually, H"(sig) using the signature sig and the identity of the node $a_{0,1}$), then hashes the value $H(X_1)$ with the authentication value $auth_0$ received as part of the signature, yielding a hashed value for node $a_{1,0}$. The recipient hashes this value with the next-level authentication value $auth_1$, and so on, until the recipient determines a value for the SVK at the root node, which the recipient compares to the previously received SVK.

Alternatively, the digital signature keys are a different type of one-time digital signature key (e.g., Lamport signature keys), rather than Winternitz keys. As noted, the hash function that is used can depend on implementation, and can be essentially any cryptographically secure one-way hash function, although a hash function that is computationally lightweight improves performance. Instead of a Merkle hash tree and SVK as verification information, another form of public/private key framework could be used for the verification information.

B. Distribution of Verification Information

In example implementations, in a first stage, a user initially enrolls with the registration authority, which is the trusted authority in the example implementations. Typically, this initial enrollment is done in person. Alternatively, registration could be performed remotely so long as procedures are followed for user identification and authentication. Different users can separately enroll with the registration authority (trusted authority).

For example, a first user provides the trusted authority with a secret password so the first user can later perform quantum secure identification with the trusted authority. This password can be a strong, secret password for authentication in setting up later QKD. The password can also incorporate a picture identification, biometric signature information, etc. For multi-factor authentication as described in Section VI, the trusted authority can provide an encrypted version of the password back to the user device.

For verification information, the trusted authority generates multiple secret one-time digital signature keys and constructs a Merkle hash tree from them. The trusted authority distributes the SVK of the Merkle hash tree to the first user, for use as the public signature verification part of the Merkle signature scheme. The trusted authority can repeat this process for a second user, third user, etc. In doing so, the trusted authority can generate digital signature keys, a Merkle hash tree and SVK specific to interaction with that user. Or, the trusted authority can use the same keys and distribute the same SVK for all users, in which case the SVK is necessarily more widely disseminated.

As part of the initial enrollment or separately, a given user can also generate multiple secret one-time digital signature keys, construct a Merkle hash tree from them, and thereby determine a SVK. The user provides the initial SVK to the trusted authority. If this process happens after QKD, the user can provide the SVK by secure transfer, using an encryption key from shared secret bits established in QKD (from the second stage). This process can be performed by the first user, second user, etc.

The trusted authority and/or any given user can repeat the process of generating secret digital signature keys, constructing a Merkle hash tree, and distributing a new SVK value in order to replenish digital signature keys. In this case, the new SVK can be distributed by secure transfer, using an encryption key from shared secret bits established in the QKD (from the second stage). Or, the trusted authority and user can engage in a new round of in-person enrollment.

For example, the trusted authority generates digital signature keys $X_0$(TA, 1, count)—a first set of private keys $X_0$ generated by the trusted authority (TA) for interaction with user 1, where the number of keys generated is indicated by "count." The trusted authority generates a hash tree $T_0$(TA, 1) for this set of keys, and distributes the verification information $V_0$(TA, 1), which is an SVK, to the first user device.

The first user device receives the verification information $V_0$(TA, 1). As a conceptually separate series of events, which could precede, follow, or happen concurrently with the key generation, etc. by the trusted authority, the first user device generates digital signature keys $X_0$(1, TA, count)—a first set of private keys $X_0$ generated by the first user device for interaction with the trusted authority (TA), where the number of keys generated is indicated by "count." The first user device generates a hash tree $T_0$(1, TA) for this set of keys, and distributes the verification information $V_0$(1, TA), which is an SVK, to the trusted authority.

The trusted authority can repeat this enrollment process and QKD with any other user. In doing so, the trusted authority can generate a separate set of digital signature keys for the trusted authority to use when interacting with each user, or the trusted authority can use the same set of digital signature keys for interacting with multiple users.

C. Uses of Digital Signature Keys and Verification Information

The trusted authority or user can sign a message with one of its digital signature keys. In general, a message signer applies a one-time digital signature to the message. The one-time digital signature can use a Winternitz or Lamport digital signature, for example, or some other kind of digital signature. The function sig [mess; p] represents the digital signature key p applied to the message mess. The signature function can be a hash function such as SHA-256 or other hash function.

The recipient of the signed message can verify the signature. In general, a message recipient is able to verify the signature using a public SVK or other verification information. For example, the SVK can be the root value of a Merkle hash tree when multiple messages are to be signed. To verify the signature, the recipient uses the SVK from the signer. Using the signature, the recipient determines a hash value for the appropriate leaf node of the signer's Merkle hash tree. The recipient hashes this value with an authentication value at successive levels of the tree to determine a value at the root node, which the recipient compares with the SVK previously received from the signer. The signature binds the message to the signer. If the signer uses a valid signature, the signer cannot later deny that it is the entity that distributed the message.

D. Replenishment of Digital Signature Keys and Verification Information

As noted, in typical usage scenarios, each digital signature key is used only one time. Eventually, the trusted authority or a user may run out of digital signature keys from the initial enrollment. The trusted authority and/or user can securely replenish digital signature keys (and distribute new verification information) as follows.

The trusted authority generates new secret digital signature keys. The trusted authority also generates new verification information, e.g., forming a new Merkle hash tree and computing a new SVK value. Using a shared secret key previously established with the user, the trusted authority encrypts and authenticates the new verification information, and transmits it to a user. The user decrypts the verification information and updates its stored verification information for the trusted authority. The trusted authority can distribute the new verification information to other users, or similarly generate new digital signature keys and distribute new verification information per other user.

Conversely, a user can replenish its digital signature keys and securely provide the trusted authority with the user's new verification information (encrypted using a key produced in QKD and shared with the trusted authority), if the user runs out of digital signature keys from enrollment.

Alternatively, the user and/or trusted authority (as registration authority) can replenish digital signature keys in another way, which does not involve distribution of new verification information. For example, the user and trusted authority, having already established (in QKD) a series of shared secret bits to use as keys, can parse a range of the shared secret bits for one of them (user or trusted authority) to use as digital signature keys. From the digital signature keys, the user and trusted authority can each independently construct a Merkle hash tree and verification information (here, a SVK as root node of the tree).

Or, for more economical utilization of the shared secret bits from QKD, the user and trusted authority can use a single agreed-upon key of the shared secret bits from QKD as the seed of a random number generator or other function, which generates a longer series of shared secret bits for use as digital signature keys by the user or trusted authority. Again, from such digital signature keys, the user and trusted authority can each independently construct a Merkle hash tree and verification information. Because the Merkle hash tree and verification information are independently determined at each side, no verification information needs to be transmitted.

The entity (user or trusted authority) that will use the digital signature keys can store the Merkle hash tree and digital signature keys. Or, to reduce storage when the digital signature keys have been created from a seed value, the entity (user or trusted authority) that will use the digital signature keys can store only the seed value and a record of which node/key was last used, in which case the entity can reconstruct the digital signature keys and Merkle hash tree as needed.

VI. Multi-Factor Authentication Using Quantum Communication

User authentication presents many challenges in modern computer systems. For example, many users have difficulty generating and remembering strong passwords for the sites they visit, which can result in a serious security weakness when users reuse passwords or resort to weak passwords.

The use of authentication tokens (such as CRYTOCard RB-1 or RSA's SecureID) for log in to computer systems with one-time passwords can alleviate the need for users to remember multiple passwords. Recent events have shown, however, these algorithmic systems have serious security shortcomings.

This section describes multi-factor authentication innovations using QC. At a high level, the multi-factor authentication uses "something remembered" and "something possessed" as first and second factors, respectively, for the authentication. For example, the first factor can be a user password, and the second factor can be a device possessed by the user, or information securely associated with such a device. In example implementations, a user having a user device (such as a QC card) assigned to that user performs single-photon QC over an optical fiber with a trusted authority. As part of the protocol for the QC, the user can prove to the trusted authority that the user both (a) knows a secret password and (b) is in possession of the device assigned to the user. In doing so, the user need not reveal the password or any function of the password. Should authentication fail, the user can attempt authentication again, without compromising security. On the other hand, if authentication succeeds, and the user establishes a trust relationship with the trusted authority, the user and trusted authority can continue by deriving shared secret bits, which can be used as a password to log in to a computer system, enter a secure web site, gain access to a building, establish proof of the user's identity, perform further QC for password-authenticated key establishment for secure communications with other users, or for some other purpose. Shared secret bits produced in this way have no algorithmic heritage to any previous password or secret bits generated in a previous session or to the secret password of the user. In contrast to other techniques, multi-factor authentication using QC offers the desirable feature of forward security. Further, a device can be configured to produce independent passwords (secret bits) for different sites/domains using multi-factor authentication with QC, which thus offers strong assurances of security rooted in laws of physics and increases user convenience. Implementations of multi-factor authentication with QC can also provide a "single sign-on" solution in which authentication is performed as part of a single, multi-stage process for the user.

Compared to previous approaches to user authentication, the multi-factor approaches described herein have several advantages.

Efficiency. Example implementations use handheld QC cards with fast, efficient algorithms that can easily be executed with several types of modern field programmable gate array. Specific examples of algorithms are described for coding, hashing, and error correction that provide good tradeoffs for performance and security.

Security. Multi-factor authentication using QC protects against even future adversaries who possess quantum memory. Multi-factor authentication can provide a secure way to put a new device on a network, or reconstitute secure connectivity on a network after an outage, both of which provide resilience, which is a highly desirable attribute.

Practicality. Example implementations of multi-factor authentication with QC use specific means (such as decoy states in QC) to enable strong security even with a weak laser source of approximately single photon per pulse. Example implementations can use telecom wavelengths over ordinary single mode optical fiber, achieving ranges of many tens of kilometers. The multi-factor authentication with QC can therefore be implemented as an overlay on existing installed fiber infrastructure, within an access, enterprise or metro-area network, and can be implemented in conjunction with the hierarchical trust infrastructure inherent in examples of the QKM innovations described above.

Usability. Example implementations are affordable to manufacture and deploy, and so can provide a security solution that can be incorporated into handheld devices such as smartphones and tablets, where explosive growth in usage has surged far ahead of the security these devices currently provide. Such devices can be used in a wide range of applications in sectors such as consumer, enterprise, electronic health records and government.

In examples in this section, the primary parties of interest are the trusted authority, a first user (of a first user device) and a second user (of a second user device). The examples scale up, however, to an arbitrary number of users.

In these examples, certain assumptions are made about infrastructure. The trusted authority and first user share a classical channel and quantum channel. The quantum channel may have some noise and loss. The trusted authority and second user also share a classical channel and quantum channel. The first and second users share a classical channel only. The first and second users possess devices with secure memory.

At a high level, various features of the multi-factor authentication innovations may be used in combination or separately.

A. Example Implementations of Multi-Factor Authentication with QC.

Example implementations of multi-factor authentication with QC proceed through several stages. In the example implementations, a given user and trusted authority share a secret password w, which the user can provide to the trusted authority during an in-person enrollment stage. The user also possesses a device (such as a handheld device with a QC card) whose secure memory contains information for a hash function h (e.g., bits specifying a randomly chosen, secret universal hash function, or key bits for a cryptographic hash function), which also can be shared with the trusted authority during the in-person enrollment stage. Another user would share a different secret hash function with the trusted authority, which would be stored in the memory of the other user's device. The multi-factor authentication allows the given user to convince the trusted authority that she knows w and possesses the device containing information for the hash function h, so as to prove the identity of the given user to the trusted authority. The trusted authority can verify the given user's identity, and accept or reject the given user's attempts at authentication.

In the event the trusted authority accepts, the given user knows that she shares new secret bits with the trusted authority, generated during the protocol for multi-factor authentication with QC. The new shared secret bits have forward security, since there is no algorithmic heritage in any previous secret information. The shared secret bits can be used by the given user for various purposes, including to log on to a computer system as a one-time password, to gain access to a building, to provide evidence of her identity, or to authenticate a subsequent QC session (e.g., for QKD enabling secure communications with other users through password-based authenticated key establishment).

The multi-factor authentication provides security in several respects and guards against several types of adversaries. A dishonest user may attempt to get the trusted authority to accept that user even though the user does not know the password w. The dishonest user cannot convince the trusted authority to accept with higher probability than guessing the password w correctly, however. In the case where the dishonest user guesses incorrectly, the user learns no more than that one password is excluded. Or, a dishonest trusted authority may attempt to learn the password w from a given (honest) user, so that the dishonest trusted authority can later masquerade as the user. The dishonest trusted authority can do no better than guess the password w, and (when the guess is incorrect) learns nothing about the password w except that one possible password is excluded. The protocol of example implementations is also secure against a dishonest user who fabricates her own device and attempts to guess both the password w and secret information for the hash function h. Such a user is unable to authenticate as a particular (targeted) user or as an arbitrary user. Similarly, a dishonest user who steals or acquires a device with secret information for the hash function h from a given (honest) user is unable to authenticate as the given (honest) user of the device or as an arbitrary user. Even a user who legitimately has a device is unable to use her own device to authenticate as any other user.

1. Example Enrollment Stages

Figure 9:
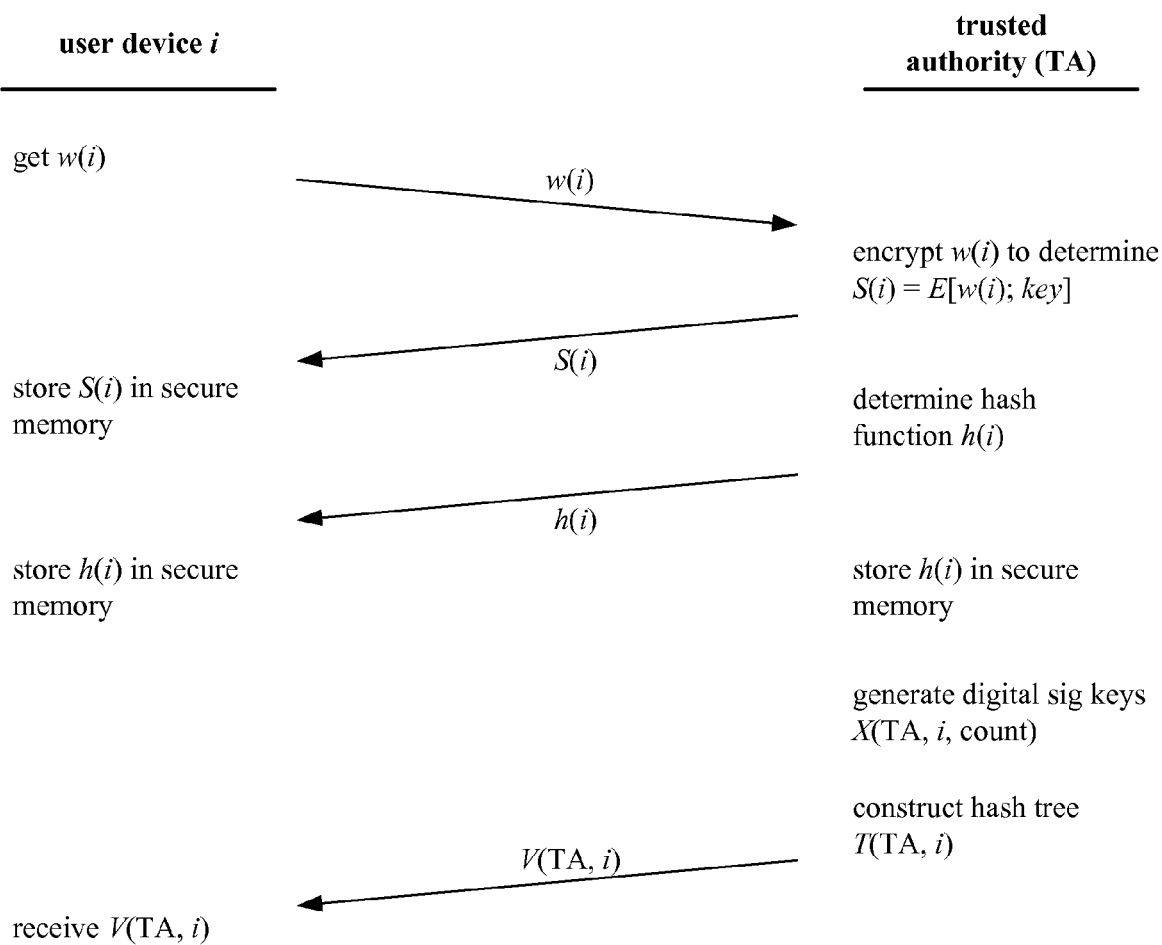
FIG. 9 is a diagram illustrating a protocol for enrolling for multi-factor authentication with QC.

FIG. 9 illustrates enrollment operations in example implementations. FIG. 9 shows operations of a given user i having a user device and a trusted authority. Specifically, FIG. 9 shows a user device i for user i. During the enrollment stage, the user meets with the trusted authority to determine user factor information and device factor information. This could be a physical meeting or online meeting. The user provides evidence of her identity to the trusted authority (e.g., multiple pieces of government-issued picture ID for an in-person meeting, or some other identification for an online meeting).

For user factor information in the example implementations, the user sets a password w(i). The constituent parts of the password w(i) depend on implementation. For example, a password w(i) can include a part that is input by the user i and is relatively easy for the user to memorize (such as a series of 8 to 12 alphanumeric characters or special ASCII characters on a conventional keyboard). The password can also include a part that represents a digest of biometric indicia (such as fingerprint scan data) provided by the user i. Alternatively, the password w(i) has other and/or additional parts.

In example implementations, the password w(i) has x ASCII symbols, which in practice will be composed of characters picked from the 94 ISO character set of typical keyboards. In example implementations, x=8, but passwords having different lengths of characters are possible. In these examples, w(i) is the concatenation of the binary representation of each ASCII character $w(i)=w_0 w_1 w_2 \ldots w_x$, where the binary representation of each ASCII character has 8 bits. When x=8 and each character has 8 bits, the binary representation of the password is 64 bits long, so there are (in principle) $2^{64}$ different passwords. In practice, given the size of the ASCII symbol set used and the fact the password should be symbols the user can remember, there are fewer possible passwords.

As part of enrollment, the user provides the secret password w(i) to the trusted authority. The trusted authority encrypts w(i) under his long-term secret key (e.g., using a symmetric key algorithm such as AES or other encryption algorithm) and provides the encrypted value to the user as a certificate S(i). Generally, S(i)=E[w(i); key], where E represents an encryption function and key represents the secret key of the trusted authority. This obviates the need for the trusted authority to store the password w(i). Alternatively, the trusted authority can store the password w(i) in secure memory.

As part of later identification, the password w(i) is used for authentication between the trusted authority and user i, but the password w(i) need not be communicated between the user i and trusted authority, except in encrypted form as the certificate S(i). As such, the password w(i) is not revealed during identification, and the password may be used multiple times without compromising security.

The trusted authority and user also establish device factor information. The trusted authority can provide the user with a device (e.g., a device having a QC card) that is uniquely identified by device factor information (e.g., bits that specify a hash function or provide a key to be used with a hash function, a serial number registered to the user). Or, the user can provide a device, which receives device factor information. In addition, the user may configure the device so that biometric information (such as a fingerprint scan or voice scan) or a personal identification number ("PIN") is needed to unlock the device.

For the device factor information, the trusted authority can determine information for a hash function h(i) that will be used to identify the device. For example, the trusted authority generates a random Toeplitz matrix with random numbers produced from a random number generator such as a deterministic random number generator ("DNRG"). For example, the DNRG can be a NIST-approved ANSI X9.31 DRNG based on triple-DES or AES, using a secret seed as input. Alternatively, another type of DRNG is used. A 1024×1024 Boolean Toeplitz matrix can be specified with 2047 single-bit numbers. The use and implementation of Toeplitz matrices is very efficient for typical mobile devices. Alternatively, however, another type of universal hash function or almost universal hash function can be used. Or, as described below, the trusted authority can generate key information for a cryptographic hash function that is used as the hash function h.

For example, one type of "almost universal" hash function is defined as follows. Let $\epsilon$ be any positive real number. An $\epsilon$-almost universal$_2$ ($\epsilon$-AU$_2$) family $H_{AU2}$ of hash functions from a set A (of a-bit strings) to a set B (of b-bit strings) is a family of functions from A to B such that, for any distinct elements $a_1$, $a_2$ of A and randomly chosen $h \in H_{AU2}$, the probability for a collision ($h(a_1)=h(a_2)$) is at most $\epsilon$. The case $\epsilon=2^{-b}$ is called "universal" hash function. The smallest possible value for $\epsilon$ is $(2^a-2^b)/(2^b(2^a-1))$.

A Toeplitz hash function is a universal hash function. Suppose the matrix M is a random b×a Boolean Toeplitz matrix. The Toeplitz hash is $f_M(\alpha)=M\cdot\alpha$, and requires a+b−1 random bits to specify f. Collision probability is $2^{-b}$.

A hash family that is "almost strongly universal$_2$, with deception probability $\epsilon$" ($\epsilon$-ASU$_2$) is a multi-set of functions $H_{ASU2}$ that satisfies the following properties: (1) each function in $H_{ASU2}$ has domain A and range B (takes a-bit strings to b-bit strings); (2) for any two distinct inputs $\alpha_1$ and $\alpha_2$ in A, and any two tags $\beta_1$ and $\beta_2$ in B (not necessarily distinct), (a) a fraction $\frac{1}{2^b}$ of the functions in $H_{ASU2}$ map $\alpha_1$ to $\beta_1$, and (b) of those functions in $H_{ASU2}$ that map $\alpha_1$ to $\beta_1$, a fraction at most $\epsilon$ also map $\alpha_2$ to $\beta_2$. The smallest value of $\epsilon$ is $2^{-b}$.

An affine Toeplitz hash is $2^{-b}$-SU$_2$. Matrix $M_{SU2}$ is random b×a Boolean Toeplitz matrix, and k is a random b-bit string. Toeplitz hash is $f_{M,k}(\alpha) = M_{SU2} \cdot \alpha \oplus k$; requires $a+b-1+b=(a+2b-1)$ random bits to specify f. The number of functions in the set is $2^{(a+2b-1)}$, and the probability of a collision is $2^{-b}$. The number of functions with the property (2)(b) is $2^{(a+2b-1)}/2^{2b} = 2^{(a-1)}$.

Returning to FIG. 9, the trusted authority stores information for the hash function h(i) in secure memory of the computer system that implements the trusted authority. The trusted authority also provides the information for the hash function h(i) to the user device i, e.g., by transmitting the information for the hash function to the user device during the in-person enrollment session or otherwise conveying the information for the hash function to the user device. The user device i stores the information for the hash function h(i) in secure memory of the user device. The user and trusted authority are understood to keep the information for the hash function secret.

In the example implementations, the trusted authority can also provide the user device with verification information for digital signature keys of the trusted authority. For example, the verification information is a public SVK for a Merkle one-time signature scheme. In FIG. 9, the trusted authority generates digital signature keys X(TA, i, count)—a set of private keys X generated by the trusted authority for interaction with user i, where the number of keys generated is indicated by "count." The trusted authority generates a hash tree T(TA, i) for this set of keys, and distributes the verification information V(TA, i), which is an SVK, to the user device i. The user device i receives the verification information V(TA, i). For additional explanation, see the section on QKM innovations. Alternatively, the trusted authority provides another form of verification information. The user stores the trusted authority's SVK (or other verification information) in the secure memory of the user device.

Multiple different users can enroll with the trusted authority. If so, different users have different passwords (or other user factor information). The trusted authority provides encrypted versions of the different passwords to the respective users to store in secure memory of the users' devices. Or, the trusted authority can store the different passwords for the respective users in secure memory in the system that implements the trusted authority. The trusted authority generates different hash function information (or other device factor information) for each of the different users' devices. The trusted authority can also generate different verification information for different users.

2. Example Identification Stages

When the user wishes to execute multi-factor authentication, she connects her device to an optical fiber network that has connectivity to the trusted authority or other network connection that supports QC to the trusted authority. The basic idea is that the user will respond to a challenge from the trusted authority, and can only respond correctly if the user has the user factor information (e.g., user password) and device factor information (e.g., hash function information).

Figure 10A:
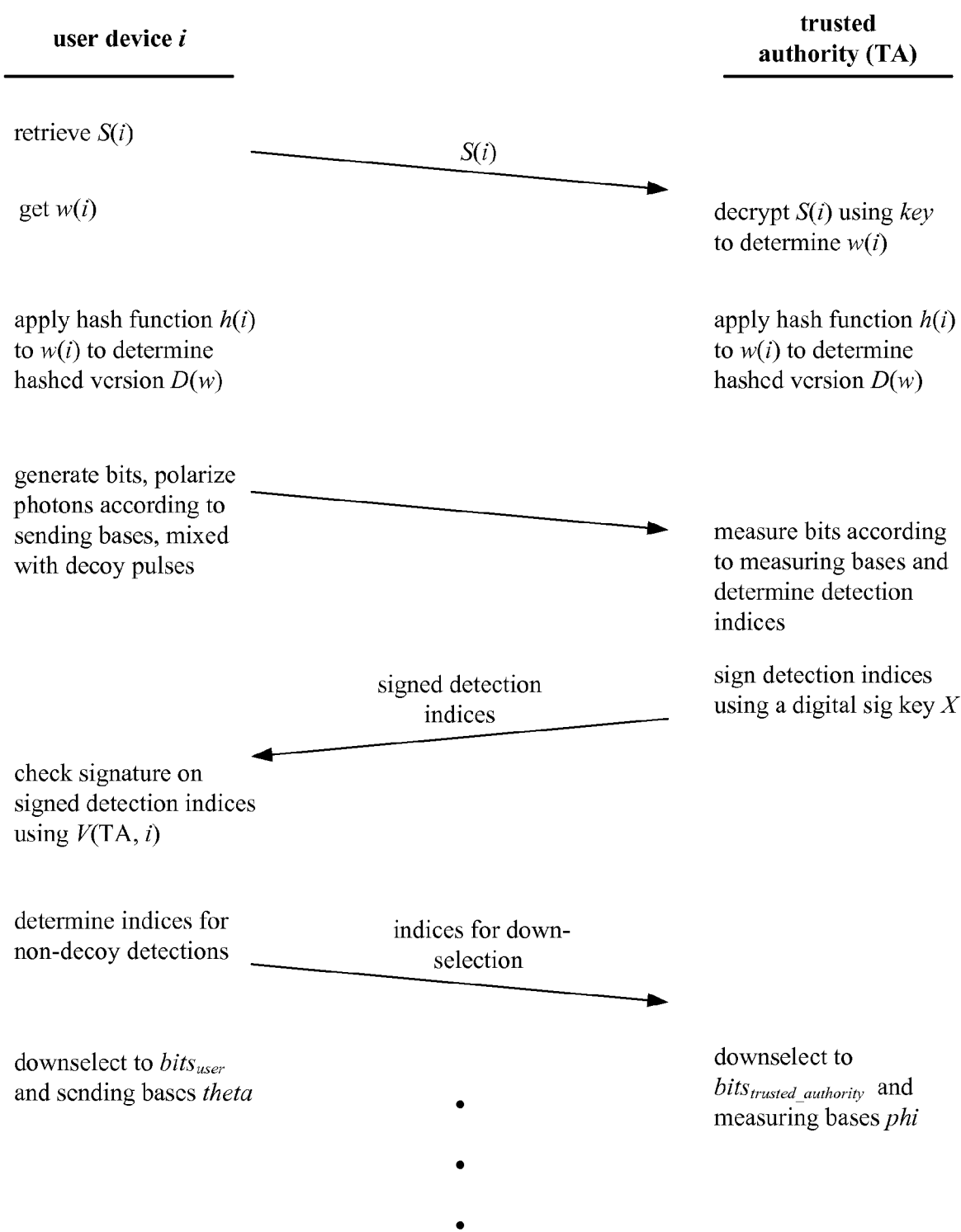
FIGS. 10a and 10b are diagrams illustrating a protocol for performing multi-factor authentication with QC.
Figure 10B:
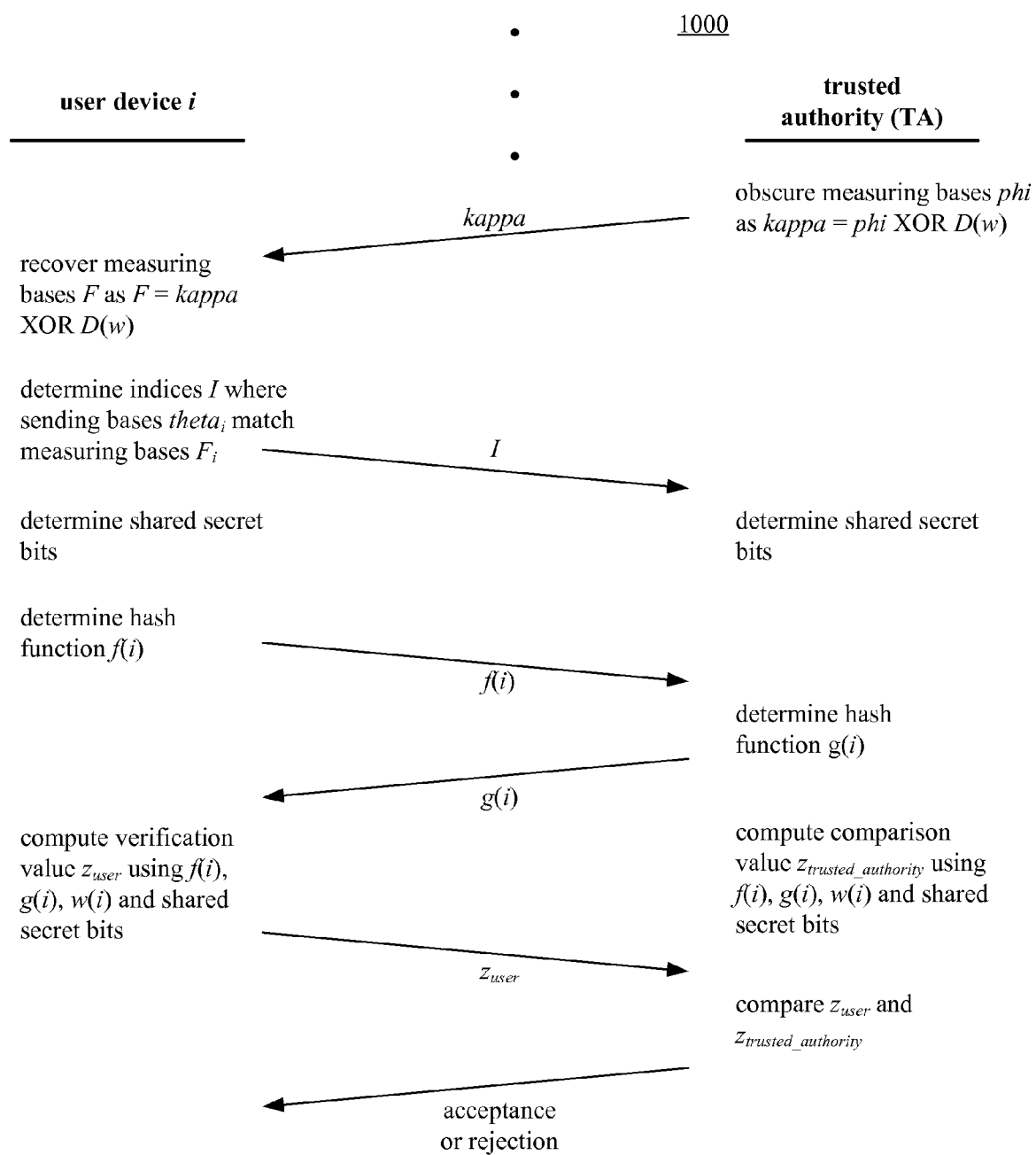

FIGS. 10a and 10b illustrate identification operations in example implementations. FIGS. 10a and 10b show operations of a given user i having a user device i and a trusted authority. In example implementations, the user device i retrieves the certificate S(i) from secure memory and sends the trusted authority the stored copy of the certificate S(i), so as to indicate the user's intent to perform multi-factor authentication. The trusted authority extracts the user's password w(i) from S(i) by decryption using his private key, key. The trusted authority therefore knows what password to expect if the user is indeed the honest user. Separately, the user enters the password w(i) at the user device i, e.g., using a keyboard and/or other input device.

With reference to FIG. 10a, both the user device i and the trusted authority now do the following using w(i), which was extracted by the trusted authority from S(i) at the computer system that implements the trusted authority, but which was entered by the user using her device's keyboard and/or other input mechanism. The user device i and the trusted authority apply the secret hash function h(i) to w(i), obtaining a hashed version D(w) of the user's password w(i).

Before applying the hash function, the user device i and trusted authority can expand the user's password w(i) in order to increase the number of bits yielded by the hash function. In general, each n-bit symbol $w_x$ of w(i) is encoded as one of $2^n$ codewords $c(w_x)$. For example, each 8-bit symbol $w_x$ of w(i) is encoded as one of 256 codewords $c(w_x)$ of the Hadamard code $C_{128}$, which is constructed from the rows of the 128×128 Hadamard matrix $H_{128}$. In this case, each codeword is 128-bits long. This specific example provides for an efficient implementation. Alternatively, other linear codes are used instead of Hadamard, or other Hadamard codes are used. The entire x-symbol password w(i) is encoded as the concatenation of x of these codewords. For example, eight 8-bit symbols of a password are replaced with eight 128-bit codewords, which are concatenated to make a 1024-bit binary sequence: $C(w(i)) = c(w_0)c(w_1) \ldots c(w_7)$. In this specific example, the minimum distance between codewords of $C_{128}$ is 64 bits (there were originally eight 8-bit symbols, for a total of 64 bits that might be different from codeword to codeword). The encoding procedure "expands" the 64-bit password up to 1024 bits, such that a guessed password will result in 512 bit disagreements, on average. There are still only $2^{64}$ possible values of C(w(i)), however, not $2^{1024}$ possible values. Both the user device i and the trusted authority apply the secret hash function h(i) to the password (here, the expanded version C(w(i)) to obtain the hashed version D(w).

Next, the user device i and the trusted authority perform QC. For example, in FIG. 10a, the user device i and trusted authority perform polarization-based BB84-type QC. The user device i uses signals of mean photon number, $\mu < 1$. Alternatively, the user device i uses another form of QC. As part of the QC, the user device i can use several different mean photon values, as decoy states, but without revealing to the trusted authority which value the user device i has used on any specific signal. For example, the user device i uses a non-decoy state with mean of order one photon per pulse, and two decoy pulses. One decoy pulse can have no photons per pulse, which can be used to check for noise, and the other decoy pulse can have of the order of 0.1 photons per pulse on average. Although the QC need not use decoy states, decoy states can be very beneficial in practice. For the example of FIG. 10a, the random bit values in non-decoy pulses are represented with $bits_{user} \in \{0, 1\}^n$, with a corresponding random basis sequence such as $\theta \in \{+, \times\}^n$ for polarization-based BB84-type QC.

The trusted authority then signs a message with one of its secret keys and transmits the signed message to the user device i. The content of the message depends on implementation. The user device i receives the signed message, and checks the signature on the message using the verification information exchanged during enrollment. In FIG. 10a, decoy states have been used, and the trusted authority creates a message to inform the user device i of the indices in the sequence of signals on which the trusted authority detected a photon. The trusted authority signs the message with one of his secret digital signature keys X. For example, the trusted authority uses a 1 to indicate a period in which a photon was measured, and uses a 0 to indicate a period in which no photon was measured, for integer indices along the axis of events for the user device i and the trusted authority, which use the same start time and periods for pulses in QC.

The user device i checks the trusted authority's signature on the message using the trusted authority's verification information V (e.g., SVK), and uses the trusted authority's decoy detections to estimate how many multi-photon signals reached the trusted authority. The user device i then determines the indices for the non-decoy detections. As shown in FIG. 10a, the user device i informs the trusted authority which of the indices of the trusted authority's detections that they will use for multi-factor authentication. Both the user device i and the trusted authority down select to those signals.

The user now has (if decoy states have been used, after down selection using detection indices) an n-bit sequence of the random bit values the user sent to the trusted authority. The random bit values are represented with bits$_{user}\in\{0,1\}^a$, with a corresponding random basis sequence such as $\theta\in\{+,\times\}^a$ when polarization-based BB84-type QC has been used. Similarly, the trusted authority has measured random bit values represented with bits$_{trusted\_authority}\in\{0,1\}^n$, with a corresponding measuring basis sequence such as $\varphi\in\{+,\times\}^n$ when polarization-based BB84-type QC has been used.

For QC, the trusted authority transmits information indicating its measuring basis sequence to the user device. An indication of the measuring bases sequence can be directly transmitted, but that might unnecessarily disclose information of interest to an eavesdropper. To avoid that, the trusted authority can obscure the information about the measuring basis sequence using the hashed version D(w) of the user password (hashed using the hash function h(i)/device factor information assigned to the user device), then transmit the obscured version of the measuring basis sequence. For example, as shown in FIG. 10b, the trusted authority can compute the exclusive OR of the measuring bases $\varphi$ and the hashed version of the password: $\kappa=\varphi\oplus D(w)$, where $\kappa$ represents the obscured version of the measuring bases of the trusted authority. In this calculation, binary values are assigned to bases. For example, "+" is interpreted as the value 0, and "×" is interpreted as the value 1. When the hashed version D(w) of the password and the information indicating the measuring basis sequence each have the same count of bits (e.g., 1024 bits), the XOR operation is a simple bit-to-bit comparison. To make it more likely that the measuring basis sequence and hashed version D(w) of the password have the same count of bits, the user device can signal enough photons during QC that the trusted authority, with very high probability, detects more than the target count of photons (or, when decoy states are used, more than the target count of photons at non-decoy indices). As part of down-selection, the user device can pick a subset of the detected photons (or, when decoy states are used, a subset of the non-decoy detections) that is equal in count to the count of bits in the hashed version D(w) of the password. The measuring basis sequence for this subset of detected photons is then used. If, however, the information indicating the measuring basis sequence has fewer bits, bits of the hashed version D(w) of the password can be dropped.

The user device i receives the information indicating the measuring bases of the trusted authority. When the trusted authority has transmitted an obscured version of the measuring bases, the user device i recovers the measuring basis sequence. The user device i can recover the information about the measuring basis sequence using the hashed version of the user password (hashed using the hash function h(i)/device factor information assigned to the user device, for a password entered by the user). For example, as shown in FIG. 10b, the user device i can compute the exclusive OR of the received information $\kappa$ and the hashed version of the password: $F=\kappa\oplus D(w)$, where $\kappa$ represents the obscured version of the measuring bases of the trusted authority, and F represents the user device's version of the measuring bases $\varphi$.

Next, the user device determines each event/index for which the sending basis (of the user device) matches the measured basis (of the trusted authority). To do this, the user device compares sending bases $\theta$ to corresponding values in the recovered measured bases F to get I={i: $\theta_i=F_i$}, where I represents the set of "matching" detection indices/time periods i to use. The number of elements in I is B. On average, when there are 1024 values in the basis sequence, B is 512, for instance. The user device can determine matching bases concurrently with recovery of the measuring bases of the trusted authority, performing the comparison operations and XOR operations on a bit-by-bit basis or (as shown in FIG. 10b) perform the operations sequentially.

The user device sends an indication of matching bases to the trusted authority. For example, the user device sends the list of indices/time periods I, as shown in FIG. 10b. Such indices/time periods are indexed along the measuring basis sequence known to the trusted authority, so the trusted authority can recover the matching bases. In this way, the user device avoids transmitting information about the sending bases and, as noted above, the information about measuring bases can be sent only in obscured form, which prevents a potential eavesdropper from learning any actual basis information. It also dramatically reduces the scope for a quantum memory attack by a dishonest trusted authority. Alternatively, the user device can transmit its sending bases to the trusted authority, for the trusted authority to determine matching bases itself by comparison to measuring bases.

At this point, both the user device and trusted authority have information enabling them to sift and select events for which sending and measuring were performed in the same bases. Both the user device and the trusted authority form their respective sets of the shared secret bits. At the user device, bits$_{user\_shared}$={bits$_{user}$|I}, where bits$_{user\_shared}$ represents the user device's calculation of shared secret bits for the transmitted bits bits$_{user}$ at the matching indices I. At the trusted authority, bits$_{trusted\_authority\_shared}$={bits$_{trusted\_authority}$|I}, where bits$_{trusted\_authority\_shared}$ represents the trusted authority's calculation of shared secret bits for the measured bits bits$_{trusted\_authority}$ at the matching indices I.

The user can also transmit (not shown in FIG. 10b) error correction information to the trusted authority, to enable the trusted authority to correct bit errors in its version of the shared secret bits. The error correction information can correspond to the syndrome of a low density parity check ("LDPC") code applied to the shared secret bits bits$_{user\_shared}$ of the user device. This is forward error correction using LDPC codes. LDPC codes provide an efficient mechanism for error correction, allowing the trusted authority to correct typical error rates found in optical fiber QC up to the range of several tens of kilometers. Alternatively, the user device and trusted authority use another type of error correction code to correct bit errors in the shared secret bits. In general, an error correction code provides enough information ("headroom") for the trusted authority to correct bit errors, without revealing so much that an eavesdropper can guess bits. The trusted authority uses the error correction information to correct any errors in its version $bits_{trusted\_authority\_shared}$ of the shared secret bits. At this point, the shared secret bits at the user device i should equal the shared secret bits at the trusted authority.

As a final stage of quantum identification, the trusted authority can initiate a challenge response sequence. For example, the user device i and trusted authority exchange information for hash functions, then use the hash functions to compute values based upon shared secret bits and user factor information, for a final verification of the user.

In example implementations, as shown in FIG. 10b, the user device i selects information for a hash function $f$ such as a random strongly 2-universal hash function and transmits information specifying the hash function $f$ to the trusted authority. The hash function $f$ can be defined as $f: \{0, 1\}^B \rightarrow \{0, 1\}^m$, for m<64. The hash function $f$ can be universal, because the user device i gets to pick it. For example, the transmitted description of the hash function $f$ can be the description of a B×m affine Toeplitz function. Also as shown in FIG. 10b, the trusted authority selects information for a hash function g such as a random strongly 2-universal hash function and transmits information specifying the hash function g to the user device i. The hash function g can be defined as g: $\{0, 1\}^{64} \rightarrow \{0, 1\}^m$, and can also be an affine Toeplitz function. Alternatively, different types of information for hash functions are exchanged (e.g., key bits for a cryptographic hash function, as described below).

As shown in FIG. 10b, user device i computes a verification value $z_{user}$ by applying the two hash functions to its shared secret bits $bits_{user\_shared}$ and the user password (entered by the user), respectively: $z_{user} = f[bits_{user\_shared}] \oplus g[w]$. The user device i sends the verification value $z_{user}$ to the trusted authority.

The trusted authority also computes a comparison value $z_{trusted\_authority}$ by applying the two hash functions to its shared secret bits $bits_{trusted\_authority\_shared}$ and the user password (recovered from the encrypted version), respectively: $z_{trusted\_authority} = f[bits_{trusted\_authority\_shared}] \oplus g[w]$. The trusted authority compares the two values to check whether its comparison value $z_{trusted\_authority}$ is equal to the verification value $z_{user}$ from the user device.

If the two values match, the user is authenticated, and the trusted authority accepts the user. As shown in FIG. 10b, the trusted authority signals information to the user device indicating the "accepted" result of the comparison. Otherwise, if the two values do not match, the user is not authenticated, and the trusted authority rejects the user. The trusted authority can signal information to the user device indicating the "rejected" result of the comparison. The signal indicating the result of the comparison can be signed by the trusted authority with one of its digital signature keys, to enable the user device to verify the source of the signal.

The trusted authority will reject dishonest users in various cases. If the trusted authority "rejects" an authentic user (e.g., due to an unusually high error rate on the quantum channel) the user may perform the protocol with the trusted authority again. This can repeat up to × times. After too many attempts, the given user (or device with given information for hash function h) is locked out.

3. Example Use Stages

If the trusted authority accepts and authenticates the user i, the user has established to the trusted authority that the user both knows the secret password w and is in possession of the unique device i assigned to the user. The user (or the user and the trusted authority) can move on to use of the shared secret bits. For example, the shared secret bits can be directly used as a password to log in to a computer system, enter a secure web site, gain access to a building, establish proof of the user's identity, perform further QC for password-authenticated key establishment for secure communications with other users, or for some other purpose.

Or, the shared secret bits can be used to generate additional shared secret bits. For example, the user device i determines information for a new hash function p. The hash function p can be an affine Toeplitz function, some other secret random 2-universal hash function, or some other form of hash function. The user device i sends information for the hash function p to the trusted authority. The user device i and trusted authority apply the hash function p to the shared secret bits they already have from QC ($bits_{user\_shared}$ for the user device, and $bits_{trusted\_authority\_shared}$ for the trusted authority) to generate additional shared secret bits, which the user can use for any of the purposes mentioned above. Also, some part of the additional shared secret bits can be used to define information for a new hash function h for use during later multi-factor authentication with QC.

4. Alternatives.

In the foregoing examples, the given user's device stores information for a single hash function h for multi-factor authentication with a trusted authority. Alternatively, the given user's device stores information for multiple different secret hash functions h, with each hash function information being associated with a particular desired action, site or domain. For example, different hash functions (or different key bits for a hash function) are used to generate one-time passwords for different sites. At the same time, one user password can be used for all of the actions, sites or domains, which simplifies the process for a user by providing a "single sign on" solution from the perspective of the user. Or, the given user's device stores information for multiple different secret hash functions h, with each hash function information being associated with a different trusted authority.

In many of the foregoing examples, the hash function h is a universal hash function that is determined by the trusted authority (e.g., by generating a random matrix), and specified with information stored in memory of the computer system that implements the trusted authority and stored in memory of the user device. Similarly, many examples of the hash functions $f$ and g are universal hash functions. Alternatively, the computer system that implements the trusted authority and the user device can use a cryptographic hash function for any of the hash functions $f$, g, h and p. For instance, for any hash function $f$, g, h or p, the system or device that specifies the hash function generates a series of random bits that is used as a key for a cryptographic hash function. The cryptographic hash function can be SHA-256 or another cryptographic hash function. The key bits are stored in memory of the user device and the computer system that implements the trusted authority (e.g., after being placed during enrollment for the hash function h, or after being exchanged during authentication for the hash function $f$ or g). To use the cryptographic hash function, the key bits are concatenated with the appropriate input to the hash function (e.g., password for the hash function h or g, or shared bits for the hash function $f$). When concatenated to the input, the key bits change the output of the cryptographic hash function.

When a cryptographic hash function is used, the stored device factor information is the key bits that are concatenated to the appropriate input. Different values of key bits can provide different device factor information. The same cryptographic hash function (e.g., SHA-256) can be used for different users, actions, sites, domains, etc., with changes to the key bits that are randomly generated for the different users, actions, sites, domains, etc. Or, different cryptographic hash functions can be used.

B. Generalized Techniques for Enrollment for Multi-Factor Authentication with QC.

FIG. 11 shows a generalized technique (1100) for enrolling a user for multi-factor authentication with QC. A user device performs the technique (1100). The user device can be a QC card as described in section I, a mobile device as described in section II, a workstation, a rack-mounted system (e.g., with a supervisory control and data acquisition (SCADA) device or programmable logic controller for a control system) or other computing device. FIG. 12 shows a corresponding generalized technique (1200) for managing enrollment of a user for multi-factor authentication with QC. A computer system that implements a trusted authority performs the technique (1200). The system that implements the trusted authority is the same as the system that implements a registration authority. Alternatively, the registration authority and trusted authority can be implemented in different systems in secure communication with each other, in which case the registration authority assumes the role of trusted authority for purposes of enrollment (e.g., providing verification information for verifying the trusted authority during multi-factor authentication, determining a hash function for device factor information).

To start, the computer system that implements the trusted authority determines device factor information to be used for the user device. For example, the computer system determines information for a hash function, which can be based at least in part on output of a random number generator. The hash function can be specified as a Toeplitz matrix or some other form of matrix. Alternatively, the device factor information is information for another type of hash function or other information that can be used to identify (to the trusted authority) the user device as being associated with a user.

With reference to FIG. 12, the computer system that implements the trusted authority transmits (1210) the device factor information associated with the user device. The device factor information is transmitted/received directly from the computer system that implements the trusted authority, e.g., during an in-person enrollment session. Alternatively, the device factor information is transmitted/received over a network connection. With reference to FIG. 11, a user device receives (1110) the device factor information associated with the user device.

The computer system that implements the trusted authority also determines user factor information. For example, the computer system that implements the trusted authority can receive a user password from a user during the in-person enrollment session, then encrypt the user password to produce an encrypted version of the user password. The user password can be an 8-12 character ASCII string suggested by the user, for example. Alternatively, the user password can have a shorter length or longer length, or use a character set other than ASCII. To encrypt the user password, the trusted authority can use a secret encryption key of the trusted authority. Alternatively, the user factor information is another type of information that can be used to identify the user to the trusted authority.

With reference to FIG. 12, the computer system that implements the trusted authority transmits (1220) the user factor information associated with a user. The user factor information is transmitted/received directly from the computer system that implements the trusted authority, e.g., during the in-person enrollment session. Alternatively, the user factor information is transmitted/received over a network connection during enrollment. With reference to FIG. 11, the user device receives (1120) user factor information associated with the user.

For use in authenticating the trusted authority, the computer system that implements the trusted authority can determine verification information associated with digital signature keys of the trusted authority. For example, the verification information is a signature verification key ("SVK") value for a Merkle hash tree, or another form of verification information. The computer system that implements the trusted authority transmits the verification information. The verification information can be transmitted directly from the computer system that implements the trusted authority, e.g., during the in-person enrollment session. Alternatively, the verification information can be transmitted over a network connection. The user device can receive the verification information and store the verification information in the memory of the user device, for use in authenticating the trusted authority.

With reference to FIG. 11, the user device stores (1130) the device factor information and the user factor information in memory of the user device for use in multi-factor authentication. For example, as part of the storing, an indication of a hash function (such as information specifying the hash function or key bits to a cryptographic hash function) is stored in the memory of the user device, and the encrypted version of the user password is stored in the memory of the user device. With reference to FIG. 12, the computer system that implements the trusted authority stores (1230) the device factor information in memory for use in multi-factor authentication. For example, as part of the storing, an indication of the hash function (such as information specifying the hash function or key bits to a cryptographic hash function) is stored in the memory of the computer system that implements the trusted authority.

To provide a "single sign on" solution in which the same user factor information is used for multiple actions, sites to be accessed or domains to be accessed, the device factor information can include different device factor information for each of the multiple actions, sites, or domains. For example, the trusted authority and user device store information for multiple different secret hash functions h, with each hash function being associated with a particular desired action, site or domain (or, the trusted authority and user device store different key bits for a cryptographic hash function for different actions, sites, domains, etc.). At the same time, the same user factor information (e.g., single user password) can be used for all of the actions, sites or domains, which simplifies the process for the user.

C. Generalized Techniques for Multi-Factor Authentication with QC.

Figure 13:
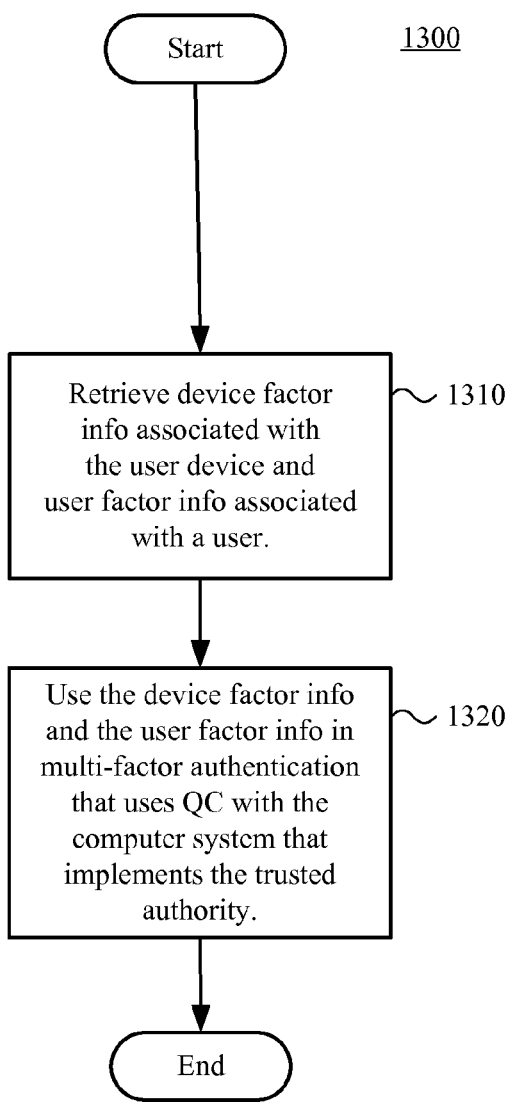
FIGS. 13 and 14 are flowcharts illustrating generalized techniques for performing multi-factor authentication with QC from the perspective of a user device and trusted authority, respectively.
Figure 14:
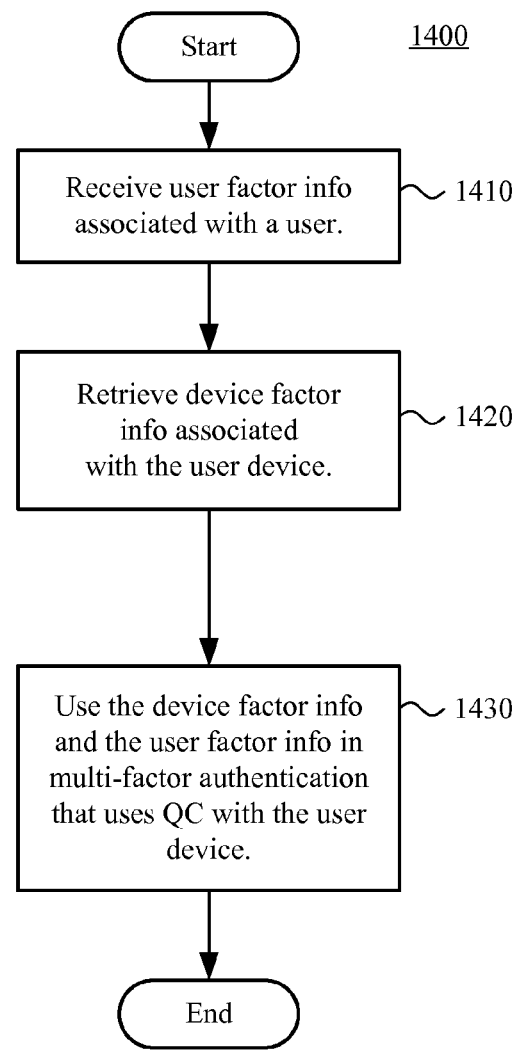

FIG. 13 shows a generalized technique (1300) for multi-factor authentication using QC with a computer system that implements a trusted authority. A user device performs the technique (1300). The user device can be a QC card as described in section I, a mobile device as described in section II, a workstation, a rack-mounted system (e.g., with SCADA device or programmable logic controller for a control system) or other computing device. FIG. 14 shows a corresponding generalized technique (1400) for multi-factor authentication using QC with a computer system that implements a trusted authority. A computer system that implements a trusted authority performs the technique (1400).

With reference to FIG. 13, to start, the user device retrieves (1310), from memory of the user device, device factor information associated with the user device and user factor information associated with a user. For example, the user factor information is an encrypted version of a user password, and the device factor information is information for a hash function, for which an indication is retrieved from the memory of the user device. If different device factor information is to be used for different actions, sites, domains, etc., the appropriate device factor information is retrieved from memory of the user device.

When the user factor information is an encrypted version of the user password, the user device can also receive user input for the user password, for use by the user device in the multi-factor authentication. As to the encrypted version of the user password, the user device also transmits it to the trusted authority, for use by the trusted authority to recover the user password.

With reference to FIG. 14, the computer system that implements the trusted authority receives (1410) user factor information associated with a user. When the user factor information is an encrypted version of a user password, the computer system also recovers the user password from the encrypted version of the user password using a secret encryption key of the trusted authority.

The computer system that implements the trusted authority also retrieves (1420), from memory of the computer system, device factor information associated with the user device. For example, the device factor information is information for a hash function, for which an indication is retrieved from the memory of the computer system. If different device factor information is to be used for different actions, sites, domains, etc., the appropriate device factor information is retrieved from memory of the computer system.

The user device uses (1320) the device factor information and the user factor information in multi-factor authentication with the computer system that implements the trusted authority (e.g., transmitting the user factor information to the computer system that implements the trusted authority, using the device factor information and a user password to determine measuring bases for QC). For its part, the computer system that implements the trusted authority uses (1430) the device factor information and the user factor information in multi-factor authentication with the user device (e.g., recovering a user password from the user factor information, using the device factor information and a user password to obscure measuring bases for QC).

The multi-factor authentication can include one or more of use of decoy states in QC, privacy amplification and error correction. For example, as part of the QC with decoy states, the user device (a) transmits pulses of photons in decoy states and pulses of photons in non-decoy states. In corresponding operations, the computer system that implements the trusted authority (b) receives pulses of photons in decoy states and pulses of photons in non-decoy states, and (c) transmits a set of detection indices signed by the trusted authority. The user device (d) receives a set of detection indices signed by the trusted authority, (e) retrieves verification information from the memory of the user device, (f) verifies the trusted authority using the verification information and the signed detection indices, and (g) transmits an indication of non-decoy states. The computer system that implements the trusted authority (h) receives an indication of non-decoy states. The user device and computer system that implements the trusted authority can down-select to non-decoy indices.

When the device factor information is information for a hash function, the computer system that implements the trusted authority can apply the hash function to a user password for the user factor information, then obscure measuring bases for QC using the results of applying the hash function to the user password. For example, the computer system computes the exclusive-OR of (a) information indicating the measuring bases and (b) the results of applying the hash function to the user password. The computer system transmits the obscured measuring bases. The user device receives the obscured information indicating measuring bases for QC, then recovers the measuring bases using the hash function and a user password for the user factor information. For example, to recover the measuring bases, the user device applies the hash function to the user password, then computes exclusive-OR of (a) the obscured information indicating measuring bases and (b) results of applying the hash function to the user password. As in conventional QC, the user device compares the measuring bases to sending bases for the QC, and determines shared secret bits for the QC. For its part, the computer system of the trusted authority receives an indication of which of the measuring bases match sending bases for the QC, and determines shared secret bits for the QC.

To continue the multi-factor authentication, the user device and trusted authority can exchange information for two hash functions. For example, the user device specifies information for one of the hash functions, and the trusted authority specifies information for the other hash function. The user device applies the two hash functions, respectively, to shared secret bits resulting from QC and a user password, so as to produce a verification value. The user device transmits the verification value. For its part, the computer system that implements the trusted authority applies the two hash functions, respectively, to shared secret bits resulting from QC and the user password, so as to produce a comparison value. The computer system of the trusted authority receives the verification value and compares the verification value to the comparison value. If they match, the user is authenticated. The computer system of the trusted authority transmits an indication of success or failure of the multi-factor authentication. The user device receives the indication of success or failure of the multi-factor authentication.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of multi-factor authentication that uses quantum communication with a computer system that implements a trusted authority, the method comprising, with a user device:

receiving, from the trusted authority, measuring bases specifying polarization bases that the trusted authority used to measure quantum signals received from the user device in a quantum communication session between the user device and the trusted authority, wherein the measuring bases have been obscured by device factor information associated with the user device and user factor information, wherein the device factor information is information for a hash function and the user factor information is a user password;

recovering the measuring bases using the device factor information and the user factor information; and deriving secret bits that are shared between the user device and the trusted authority using the recovered measuring bases.

2. The method of claim 1, the method further comprising, with the user device:
retrieving, from the memory of the user device, an encrypted version of the user password and the device factor information; and
as part of the multi-factor authentication, transmitting the encrypted version of the user password for use by the trusted authority to recover the user password.

3. The method of claim 1 wherein the multi-factor authentication includes:
transmitting pulses of photons;
receiving a message signed by the trusted authority;
retrieving verification information from the memory of the user device;
verifying the trusted authority using the verification information and the signed message.

4. The method of claim 1 wherein the recovering the measuring bases comprises:
applying the hash function to the user password; and
computing an exclusive-OR of the obscured measuring bases received from the trusted authority and results of applying the hash function to the user password.

5. The method of claim 1 wherein the multi-factor authentication further comprises:
exchanging information for two hash functions with the trusted authority;
applying one of the two hash functions to shared secret bits resulting from quantum communication and the other of the two hash functions to a user password for the user factor information to produce a verification value;
transmitting the verification value; and
receiving an indication of success or failure of the multi-factor authentication.

6. A computer system that implements a trusted authority, wherein the computer system is adapted to perform a method of multi-factor authentication that uses quantum communication, the computer system comprising:
at least one communication connection configured to receive, from a user device, user factor information associated with a user;
at least one memory; and
at least one processing unit configured to:
retrieve, from the memory of the computer system, device factor information associated with the user device, wherein the device factor information is information for a hash function;
apply the hash function to a user password derived from the user factor information;
obscure, based on the device factor information and the user factor information, measuring bases specifying polarization bases that the computer system used to measure quantum signals received from the user device in a quantum communication session with the user device, wherein the measuring bases are obscured based on results of applying the hash function to the user password;
send the obscured measuring bases to the user device; and
derive secret bits that are shared between the computer system and the user device using the measuring bases, wherein the secret bits are derived based on a received indication of which of the measuring bases match sending bases for the quantum communication session.

7. The computer system of claim 6 wherein the user factor information is an encrypted version of a user password, and wherein the at least one processing unit is further configured to:
recover the user password from the encrypted version of the user password using a secret encryption key of the trusted authority.

8. The computer system of claim 6 wherein the at least one processing unit is configured to obscure the measuring bases based on
an exclusive-OR of information indicating the measuring bases and the results of applying the hash function to the user password.

9. The computer system of claim 6 wherein the at least one processing unit is further configured to:
exchange information for two hash functions with the user device;
apply one of the two hash functions to the shared secret bits resulting from quantum communication and apply the other of the two hash functions to a user password derived from the user factor information to produce a comparison value;
receive a verification value;
compare the verification value to the comparison value; and
transmit an indication of success or failure of the multi-factor authentication.

10. The computer system of claim 6 wherein functions of the trusted authority are distributed across two or more physical nodes using quantum secret sharing, and wherein the quantum communication with the user device includes quantum secret sharing between the user device and the two or more physical nodes constituting the trusted authority.

* * * * *